US012370798B2

(12) United States Patent
Yanagihara et al.

(10) Patent No.: US 12,370,798 B2
(45) Date of Patent: Jul. 29, 2025

(54) LIQUID EJECTING APPARATUS

(71) Applicant: SEIKO EPSON CORPORATION, Tokyo (JP)

(72) Inventors: Hirokazu Yanagihara, Chino (JP); Eiichiro Watanabe, Matsumoto (JP); Hiroaki Okui, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 254 days.

(21) Appl. No.: 18/164,864

(22) Filed: Feb. 6, 2023

(65) Prior Publication Data

US 2023/0249466 A1 Aug. 10, 2023

(30) Foreign Application Priority Data

Feb. 7, 2022 (JP) ................................ 2022-017021

(51) Int. Cl.
*B41J 2/165* (2006.01)
*B41J 2/14* (2006.01)

(52) U.S. Cl.
CPC ............... *B41J 2/1652* (2013.01); *B41J 2/14* (2013.01); *B41J 2002/14403* (2013.01)

(58) Field of Classification Search
CPC ..... B41J 2/1652; B41J 2/14; B41J 2/18; B41J 2/19; B41J 2002/14403; B41J 2202/12; B41J 2202/07; B41J 2202/21; B41J 2025/008; D06B 23/20; D06B 5/30
USPC .................................. 347/22, 35, 89, 92, 93
See application file for complete search history.

(56) References Cited

U.S. PATENT DOCUMENTS 9,895,897 B2 * 2/2018 Miravet Jimenez ..... B41J 2/175
9,925,803 B2 * 3/2018 Hori ..................... B41M 7/0081
2011/0242235 A1 * 10/2011 Kitamura ................ B41J 2/175
347/89

FOREIGN PATENT DOCUMENTS

EP 3466698 A1 * 4/2019 ................ B41J 2/14
JP 2009-023289 A 2/2009
JP 2009-184264 A 8/2009
WO WO-2018225333 A1 * 12/2018 ................ B41J 2/14

* cited by examiner

*Primary Examiner* — Leslie J Evanisko
*Assistant Examiner* — Thomas Ray Knief
(74) *Attorney, Agent, or Firm* — WORKMAN NYDEGGER

(57) ABSTRACT

A liquid ejecting apparatus includes: a first head disposed such that an arrangement angle is a first angle; a second head disposed such that an arrangement angle is a second angle, which is greater than the first angle; a first circulation mechanism circulating liquid between a first reservoir and the first head; a second circulation mechanism circulating liquid between a second reservoir and the second head; and a control unit controlling the first and the second circulation mechanisms. The control unit performs circulation cleaning, in which the liquid is circulated, on multiple heads including the first head and the second head. The amount of the liquid circulating through the first head during the circulation cleaning is a first amount, and the amount of the liquid circulating through the second head during the circulation cleaning is a second amount that is greater than the first amount.

9 Claims, 17 Drawing Sheets

FIG. 16

T1

| ARRANGEMENT ANGLE θ [deg] | CIRCULATION-CLEANING FLOW RATE [g/s] | CIRCULATION-CLEANING PERIOD [s] | TOTAL FLOW RATE [g] | |
|---|---|---|---|---|
| 0 | 1.5 | 30 | 45 | 160_1 |
| 30 | 1.8 | 60 | 108 | 160_2 |
| 45 | 1.9 | 90 | 171 | 160_3 |
| 60 | 2 | 120 | 240 | 160_4 |
| 75 | 1.5 | 180 | 270 | 160_5 |
| 90 | 1.5 | 180 | 270 | 160_6 |

LIQUID EJECTING APPARATUS

The present application is based on, and claims priority from JP Application Serial Number 2022-017021, filed Feb. 7, 2022, the disclosure of which is hereby incorporated by reference herein in its entirety.

BACKGROUND

1. Technical Field

The present disclosure relates to a liquid ejecting apparatus.

2. Related Art

A known liquid ejecting apparatus represented by an ink jet printer has a head that ejects liquid, such as ink, onto a medium. For example, JP-A-2009-184264 discloses a liquid ejecting apparatus in which a medium is wound around a drum, and liquid is ejected onto the medium from multiple heads disposed around the drum. The multiple heads included in this liquid ejecting apparatus are disposed at different angles with respect to the horizontal plane. JP-A-2009-23289 discloses a liquid ejecting apparatus having a circulation mechanism that recovers liquid supplied from a reservoir, which stores the liquid, to a head to supply the liquid to the head again.

However, when the circulation mechanism disclosed in JP-A-2009-23289 is provided in the liquid ejecting apparatus disclosed in JP-A-2009-184264, there is a problem in that, even when the liquid is circulated by the circulation mechanism, the level by which bubbles in the liquid are discharged varies among the heads because the multiple heads are provided at different angles.

SUMMARY

According to an aspect of the present disclosure, there is provided a liquid ejecting apparatus including: a first head that has a first nozzle face having multiple nozzles through which liquid is ejected and that is disposed such that an angle between the first nozzle face and a horizontal plane is a first angle; a second head that has a second nozzle face having multiple nozzles through which the liquid is ejected and that is disposed such that an angle between the second nozzle face and the horizontal plane is a second angle, which is greater than the first angle; a first reservoir that stores the liquid to be supplied to the first head; a second reservoir that stores the liquid to be supplied to the second head; a first circulation mechanism that circulates the liquid between the first reservoir and the first head; a second circulation mechanism that circulates the liquid between the second reservoir and the second head; and a control unit that controls the first circulation mechanism and the second circulation mechanism. The control unit performs circulation cleaning, in which the liquid is circulated, on multiple heads including the first head and the second head. The amount of the liquid circulating through the first head during the circulation cleaning is a first amount, and the amount of the liquid circulating through the second head during the circulation cleaning is a second amount, which is greater than the first amount.

BRIEF DESCRIPTION OF THE DRAWINGS

FIG. 16 is a table showing example circulation-cleaning flow rates and circulation-cleaning periods.

DESCRIPTION OF EXEMPLARY EMBODIMENTS

Figure 1:
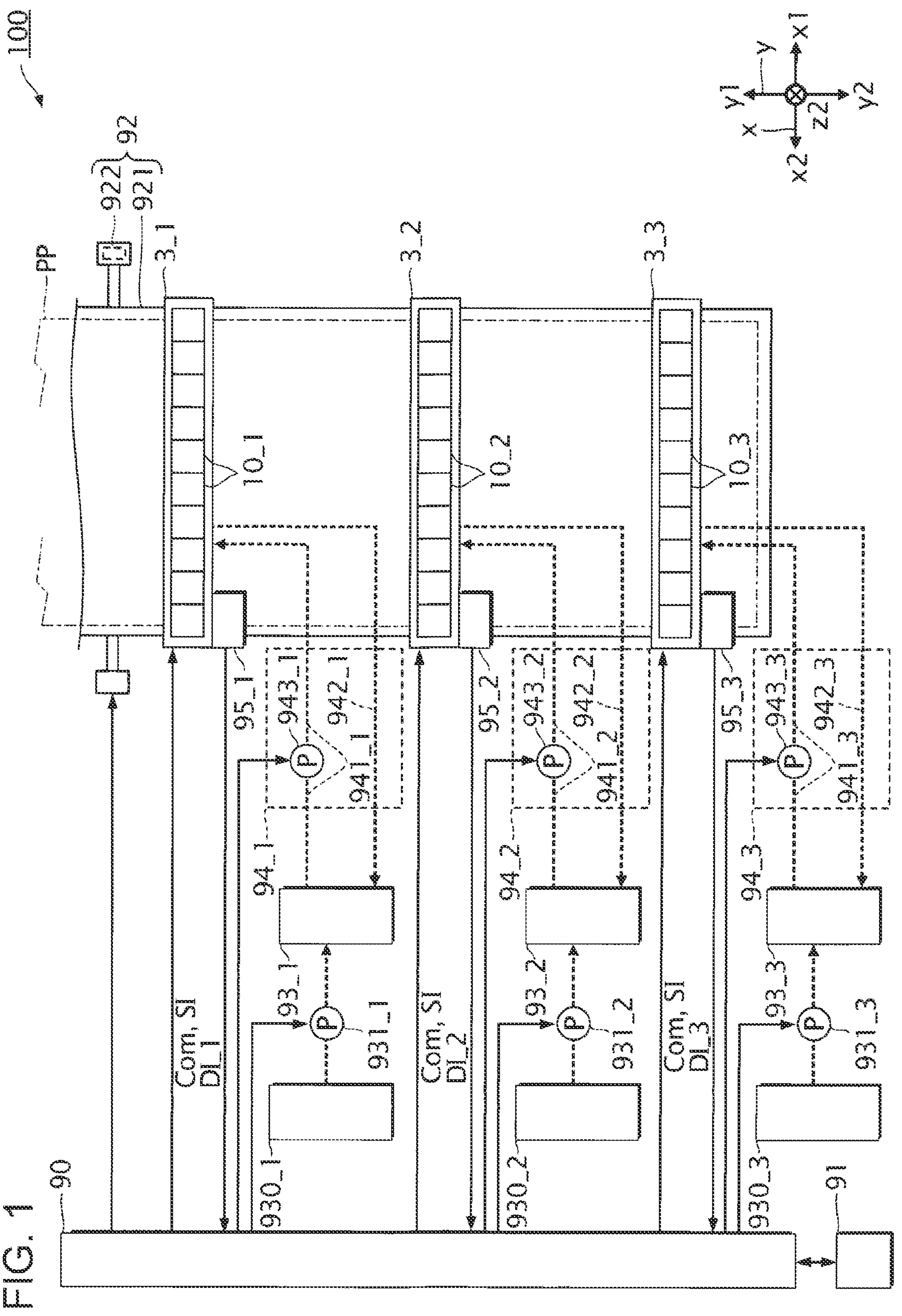
FIG. 1 schematically illustrates the configuration of a liquid ejecting apparatus 100 according to a first embodiment.

Embodiments of the present disclosure will be described below with reference to the drawings. In the drawings, the dimensions and scales of the respective components are different from those in actuality. Although various technically preferred limitations are imposed on the embodiments described below as the embodiments are preferred examples of the present disclosure, the scope of the present disclosure is not limited to the embodiments, unless otherwise stated in the description below.

The description will be given using x, y, and z axes where appropriate. Furthermore, one direction parallel to the x axis is referred to as the x1 direction, and the direction opposite to the x1 direction is referred to as the x2 direction. Similarly, opposite directions parallel to the y axis are referred to as the y1 and y2 directions. Furthermore, opposite directions parallel to the z axis are referred to as the z1 and z2 directions. The xyz coordinate system using the x, y, and z axes is a global coordinate system. Accordingly, the z2 direction corresponds to the direction of gravitational force, and the z axis is parallel to the direction of gravitational force.

1. First Embodiment

1-1. Schematic Configuration of Liquid Ejecting Apparatus

FIG. 1 schematically illustrates the configuration of a liquid ejecting apparatus 100 according to a first embodiment. The liquid ejecting apparatus 100 is an ink jet printing apparatus that ejects ink, which is an example of liquid, onto a medium PP. The liquid ejecting apparatus 100 according to this embodiment is a so-called line printing apparatus, which has multiple ink-ejecting nozzles distributed over the entire area of the medium PP in the width direction. Typically, the medium PP is printing paper. The medium PP is not limited to printing paper and may be other printing targets that are made of desired materials, such as resin film and fabric.

As shown in FIG. 1, multiple liquid supply sources 930 that store ink are attached to the liquid ejecting apparatus 100. The liquid supply sources 930 serve as main tanks. The liquid supply sources 930 may be, for example, cartridges that are removably attached to the liquid ejecting apparatus 100, bag-shaped ink packs that are made of a flexible film, or ink tanks that can be refilled with ink. The ink stored in the liquid supply sources 930 may be of any type.

The liquid supply sources 930 according to this embodiment each include a first liquid container and a second liquid container (not shown). Reservoirs 93 store ink to be supplied to heads 10 (described below). Pumps 931 are provided between the liquid supply sources 930 and the corresponding reservoirs 93. The first liquid containers store first ink. The second liquid containers store second ink, which is of different type than the first ink. For example, the first ink and the second ink are different color inks. The first ink and the second ink may be of the same type. The composition of the ink is not specifically limited and may be any of water-based ink, in which colorant, such as dye or pigment, is solved in a water-based solvent, UV-curable ink, and solvent-based ink.

In addition to the multiple liquid supply sources 930, the multiple pumps 931, and the multiple reservoirs 93, the liquid ejecting apparatus 100 includes a control unit 90, a storage unit 91, a transport mechanism 92, multiple head modules 3, multiple circulation mechanisms 94, and multiple angle sensors 95. In the first embodiment, the liquid ejecting apparatus 100 includes the reservoirs 93, the circulation mechanisms 94, and the angle sensors 95 that correspond to three head modules 3. More specifically, the liquid ejecting apparatus 100 includes the head modules 3_1 to 3_3, the liquid supply sources 930_1 to 930_3, the pumps 931_1 to 931_3, the reservoirs 93_1 to 93_3, the circulation mechanisms 94_1 to 94_3, and the angle sensors 95_1 to 95_3. Note that the number of the head modules 3 provided in the liquid ejecting apparatus 100 is not limited to three and may be two or more than three. The description below is based on an assumption that the liquid ejecting apparatus 100 has three head modules 3. The heads 10 provided in the head module 3_1 will be described as the heads 10_1, the heads 10 provided in the head module 3_2 will be described as the heads 10_2, and the heads 10 provided in the head module 3_3 will be described as the heads 10_3. The heads 10_1, 10_2, and 10_3 are collectively referred to as the heads 10.

The storage unit 91 includes a magnetic storage device, a flash read-only memory (ROM), or the like. The storage unit 91 stores various programs and various data.

The control unit 90 controls the operation of the respective components of the liquid ejecting apparatus 100. The control unit 90 is a processing circuit, such as a central processing unit (CPU) or a field programmable gate array (FPGA). The control unit 90 may be a multiprocessor having multiple processors. The control unit 90 realizes various control by reading out a program from the storage unit 91, executing the program, and using the data stored in the storage unit 91 where appropriate. The control unit 90 outputs driving signals Com and control signals SI to the heads 10. The driving signals Com include driving pulses for driving elements Ea and Eb of the driving heads 10. The control signals SI specify whether to supply the driving signals Com to the driving elements Ea and Eb.

Figure 2:
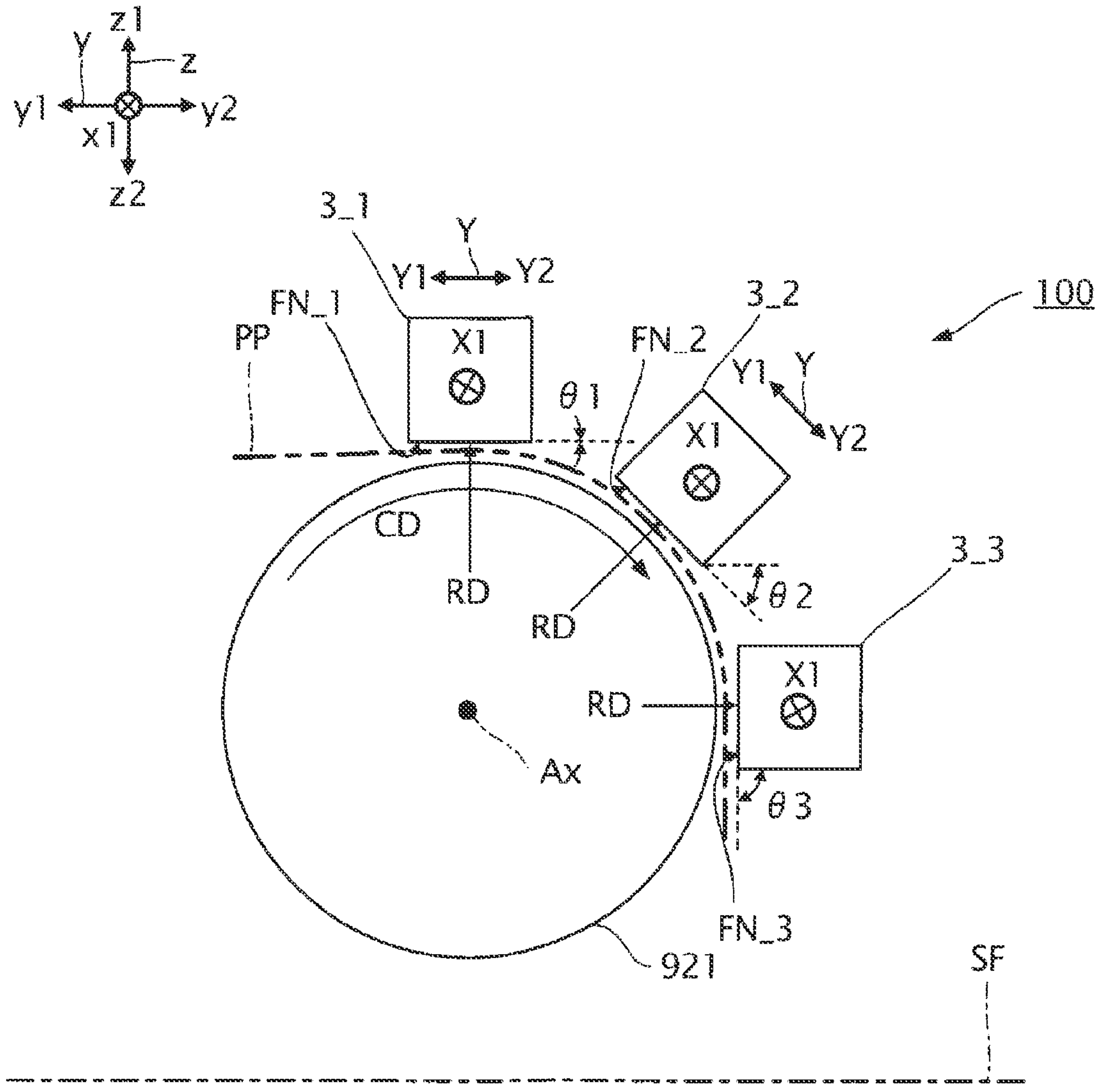
FIG. 2 illustrates the liquid ejecting apparatus 100 as viewed in the x1 direction.

The transport mechanism 92 transports the medium PP. The transport mechanism 92 includes a drum 921 that transports the medium PP in a state in which the medium PP is attracted to the outer circumferential surface thereof, and a driving mechanism 922, such as a motor. FIG. 2 illustrates the positional relationship between the drum 921 and the three head modules 3.

FIG. 2 illustrates the liquid ejecting apparatus 100 as viewed in the x1 direction. The drum 921 is a cylindrical or columnar member having an outer circumferential surface around a center axis Ax parallel to the x axis. The drum 921 is driven around the center axis Ax by the driving mechanism 922. The outer circumferential surface of the drum 921 is charged by a charger (not shown). The electrostatic force induced by this charging electrostatically attracts the medium PP to the outer circumferential surface of the drum 921.

The head modules 3_1, 3_2, and 3_3 face the outer circumferential surface of the drum 921. The orientations of the head modules 3_1, 3_2, and 3_3 about axes parallel to the x-axis direction are different from one another. More specifically, the head modules 3_1, 3_2, and 3_3 are arranged in this order in the circumferential direction CD of the center axis Ax, along the outer circumferential surface of the drum 921.

Because the head modules 3_1, 3_2, and 3_3 are disposed at positions around a rotation axis extending in the x1 direction, which corresponds to the longitudinal direction of the head modules 3, nozzle faces FN of the heads 10 of the head modules 3 are perpendicular to the radial direction RD of the center axis Ax of the drum 921 and are inclined with respect to a horizontal plane SF. Hereinbelow, to simplify the description, the angle between the nozzle face FN and the horizontal plane SF may be described as the "arrangement angle θ". The nozzle faces FN 1 of the heads 10_1 of the head module 3_1 are disposed such that the arrangement angle θ is an arrangement angle θ1. The nozzle faces FN_2 of the heads 10_2 of the head module 3_2 are disposed such that the arrangement angle θ is an arrangement angle θ2. The nozzle faces FN 3 of the heads 10_3 of the head module 3_3 are disposed such that the arrangement angle θ is an arrangement angle θ3. When two planes are parallel, the angle between the two planes is 0°, and when two planes intersect each other, the angle between the two planes is the most acute angle among four angles formed between a first line segment and a second line segment that are perpendicular to a first line of intersection between the two planes. The first line segment is a line segment that is perpendicular to the first line of intersection and that is included in one of the two planes. The second line segment is a line segment that is perpendicular to the first line of intersection and that is included in the other of the two planes.

As shown in FIG. 2, the arrangement angle θ3 is greater than the arrangement angle θ2. The arrangement angle θ2 is greater than the arrangement angle θ1. The arrangement angle θ1 is, for example, from 0° to less than 15° and, in this embodiment, 0°. The arrangement angle θ2 is, for example, between 15° and 70° and, in this embodiment, 45°. The arrangement angle θ3 is, for example, from 70° to 90° and, in this embodiment, 90°. The nozzle faces FN 1 are an example of a "first nozzle face", the heads 10_1 are an example of a "first head", the arrangement angle θ1 is an example of a "first angle", the reservoir 93_1 is an example of a "first reservoir", and the circulation mechanism 94_1 is an example of a "first circulation mechanism". The nozzle faces FN_2 are an example of a "second nozzle face", the heads 10_2 are an example of a "second head", the arrangement angle θ2 is an example of a "second angle", the reservoir 93_2 is an example of a "second reservoir", and the circulation mechanism 94_2 is an example of a "second circulation mechanism". The nozzle faces FN 3 are an example of a "third nozzle face", the heads 10_3 are an example of a "third head", the arrangement angle θ3 is an example of a "third angle", the reservoir 93_3 is an example of a "third reservoir", and the circulation mechanism 94_3 is an example of a "third circulation mechanism".

Referring back to FIG. 1, the three head modules 3 eject, under the control of the control unit 90, ink supplied from the reservoirs 93 corresponding to the three head modules 3 through the circulation mechanisms 94 corresponding to the three head modules 3 through the multiple nozzles onto the medium PP. Ink is supplied from the liquid supply sources 930 corresponding to the three head modules 3 to the reservoirs 93 corresponding to the three head modules 3 by the pumps 931, under the control of the control unit 90. The three head modules 3 are line heads each having multiple heads 10 that are disposed such that the multiple nozzles are distributed over the entire area of the medium PP in the x-axis direction. In other words, the multiple heads 10 constitute long line heads extending in the x-axis direction.

The three circulation mechanisms 94 supply ink to the multiple heads 10 in the head modules 3 and recover the ink discharged from the multiple heads 10 in order to supply the ink again to the heads 10. The circulation mechanisms 94 each include a supply path 941 through which ink is supplied from the reservoir 93 to the multiple heads 10, a recovery path 942 through which the ink is recovered from the multiple heads 10 to the reservoir 93, and a circulating mechanism 943 that circulates the ink as appropriate. The circulating mechanism 943 is provided in the supply path 941. The circulating mechanism 943 circulates the ink in the supply path 941, under the control of the control unit 90. The circulating mechanism 943 is, for example, a pump or a compressor. Operation of the circulation mechanisms 94 suppresses an increase in the ink viscosity and reduces accumulation of bubbles in the ink.

Each of the three angle sensors 95 measures the arrangement angle θ of a head 10 in the corresponding head module 3 and transmits angle information DI indicating the measured arrangement angle to the control unit 90. More specifically, the angle sensor 95_1 measures the arrangement angle θ1 of one of the multiple heads 10_1 and transmits angle information DI_1 indicating the arrangement angle θ1 to the control unit 90. The angle sensor 95_2 measures the arrangement angle θ2 of one of the multiple heads 10_2 and transmits angle information DI 2 indicating the arrangement angle θ2 to the control unit 90. The angle sensor 95_3 measures the arrangement angle θ3 of one of the multiple heads 10_3 and transmits angle information DI_3 indicating the arrangement angle θ3 to the control unit 90. The three angle sensors 95 are each disposed near one of the multiple heads 10 in the head modules 3 to measure the arrangement angle θ of the head 10. Although the liquid ejecting apparatus 100 according to this embodiment includes one angle sensor 95 for one head module 3, the heads 10 may include the angle sensors 95.

The liquid ejecting apparatus 100 performs printing processing, in which an ink image is formed on the surface of a medium PP, by ejecting ink from the multiple head modules 3 in parallel with transportation of the medium PP by the transport mechanism 92. Also during the printing processing, ink is circulated between the reservoirs 93 and the heads 10 by the operation of the circulation mechanisms 94. Furthermore, the liquid ejecting apparatus 100 performs maintenance processing before and/or after the printing processing. As one maintenance processing, the liquid ejecting apparatus 100 performs circulation cleaning, in which ink is circulated between the reservoirs 93 and the heads 10. The flow rate in the circulation cleaning is greater than the maximum flow rate in the printing processing. The flow rate means the amount of liquid moved per unit period. The maximum flow rate in the printing processing occurs when a so-called solid image is formed on a medium PP. Hereinbelow, the flow rate in the circulation cleaning will be described as the "circulation-cleaning flow rate". Furthermore, the period for which the circulation cleaning is performed will be described as the "circulation-cleaning period". For example, the maximum flow rate in the printing processing is 1.1 [g/s]. The circulation-cleaning flow rate is at least 1.5 [g/s], although depending on the head 10.

The control unit 90 controls the three circulation mechanisms 94. More specifically, the control unit 90 controls the circulating mechanisms in the circulation mechanisms 94 to adjust the circulation-cleaning flow rate and the circulation-cleaning period. In adjusting the circulation-cleaning flow rate, for example, when the circulating mechanisms are pumps, the control unit 90 changes the rotation speed of rotors in the pumps to achieve a desired flow rate. Furthermore, when the circulating mechanisms are compressors, the control unit 90 adjusts the differential pressure of the compressors to achieve a desired flow rate. The multiple heads 10 in each of the three head modules 3 are an example of "multiple heads including a first head and a second head".

Now, the head modules 3_1, 3_2, and 3_3, collectively called the head modules 3, will be described below with reference to FIG. 3.

1.2. Configuration of Head Module 3

Figure 3:
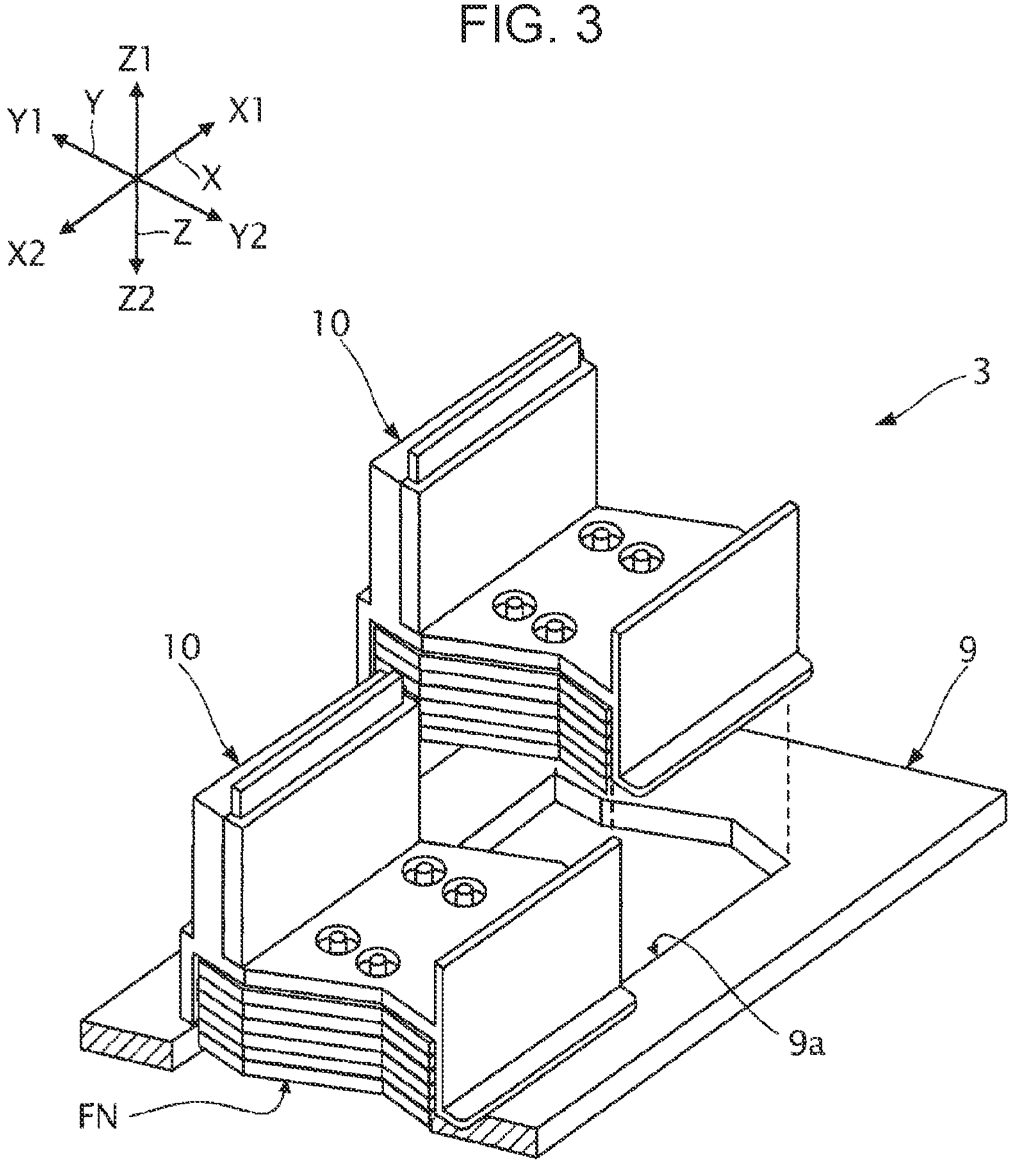
FIG. 3 is a perspective view of a head module 3.

FIG. 3 is a perspective view of a head module 3. In the description below, the XYZ coordinate system will be used in addition to the xyz coordinate system. One direction parallel to the X axis is referred to as the X1 direction, and the direction opposite to the X1 direction is referred to as the X2 direction. Similarly, opposite directions parallel to the Y axis are referred to as the Y1 and Y2 directions. Furthermore, opposite directions parallel to the Z axis are referred to as the Z1 and Z2 directions. The XYZ coordinate system is a local coordinate system showing coordinates based on each head module 3. When the orientation of the head module 3 changes, the orientation of the X-axis direction, the orientation of the Y-axis direction, and the orientation of the Z-axis direction change. For example, as shown in FIG. 2, the Y-axis direction of the head module 3_1 and the Y-axis direction of the head module 3_2 are different.

Each head module 3 includes multiple heads 10 and a head fixing substrate 9 that holds the multiple heads 10. The multiple heads 10 are arranged side-by-side along the X-axis direction and are fixed to the head fixing substrate 9. The head module 3 may be a long line head extending in the X-axis direction and composed solely of a single head 10 having multiple nozzles N distributed over the entire area of a medium PP in the X-axis direction. The head fixing substrate 9 has multiple attachment holes 9a used to attach the heads 10. The heads 10 are supported by the head fixing substrate 9 in a state of being inserted through the attachment holes 9*a*.

1.3. Configuration of Head 10

Figure 4:
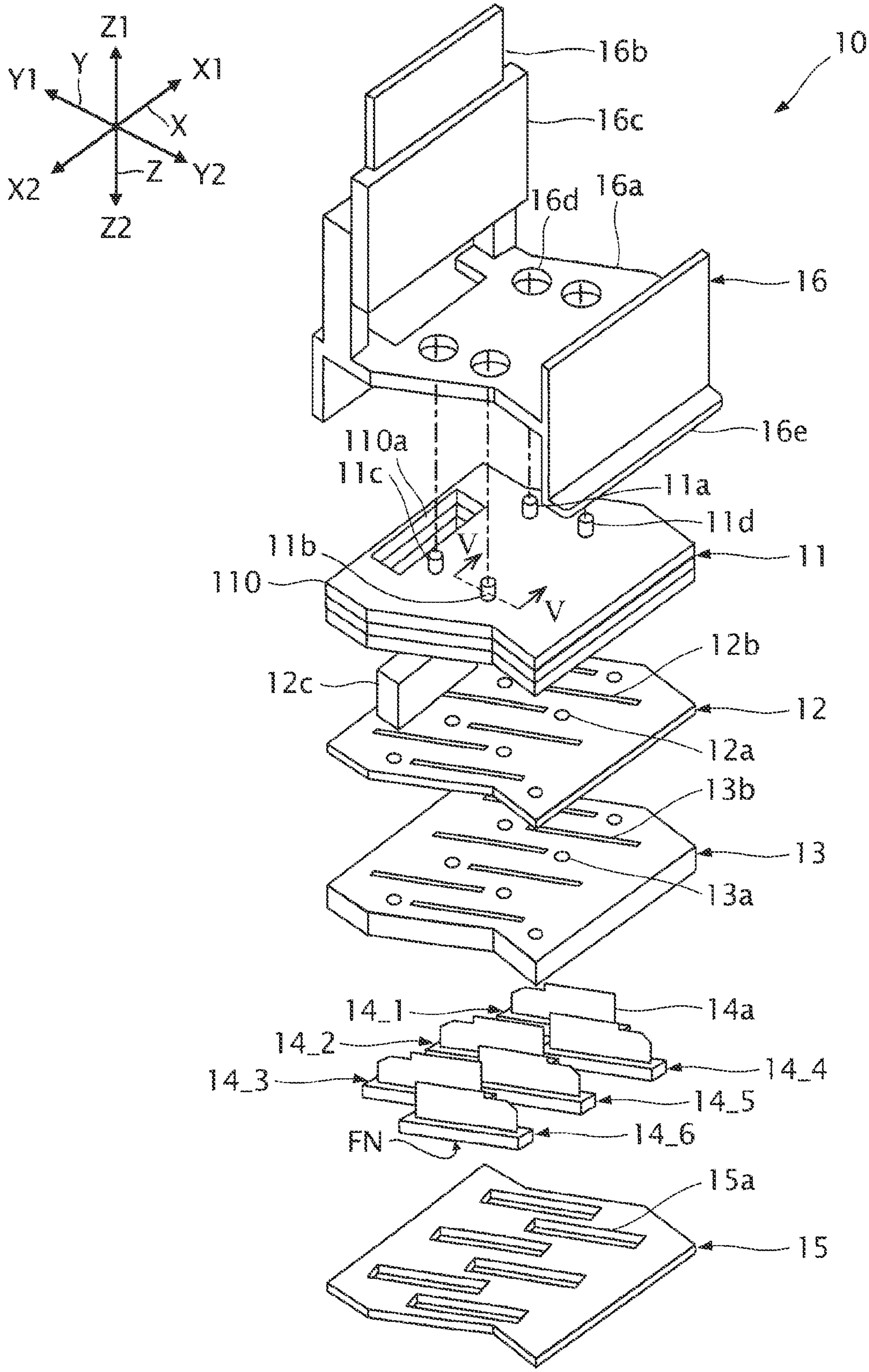
FIG. 4 is an exploded perspective view of a head 10.

FIG. 4 is an exploded perspective view of a head 10. As shown in FIG. 4, the head 10 includes a flow-path structural body 11, a wiring board 12, a holder 13, multiple head chips 14_1, 14_2, 14_3, 14_4, 14_5, and 14_6, a fixing plate 15, and a base 16. The base 16, the flow-path structural body 11, the wiring board 12, the holder 13, the multiple head chips 14_1, 14_2, 14_3, 14_4, 14_5, and 14_6, and the fixing plate 15 are arranged in this order in the Z2 direction. The respective components of the head 10 will be sequentially described below. Note that each of the head chips 14_1, 14_2, 14_3, 14_4, 14_5, and 14_6 may be referred to as the head chip 14.

The flow-path structural body 11 is provided with, inside thereof, a flow path through which ink is circulated between the circulation mechanism 94 and the multiple head chips 14. As shown in FIG. 4, the flow-path structural body 11 includes a flow path member 110 and connecting tubes 11*a*, 11*b*, 11*c*, and 11*d*. Although not illustrated in FIG. 4, the flow path member 110 is provided with a flow-in path through which the first ink flows into the multiple head chips 14, a flow-in path through which the second ink flows into the multiple head chips 14, a flow-out path through which the first ink flows out of the multiple head chips 14, and a flow-out path through which the second ink flows out of the multiple head chips 14. More specifically, the connecting tubes 11*a* and 11*b* communicate with the flow-in path, and the connecting tubes 11*c* and 11*d* communicate with the flow-out path. Filters 116 for catching foreign substances and the like are provided between the connecting tube 11*a* and the flow-in path and between the connecting tube 11*b* and the flow-in path. The filters 116 may be provided in the middle of the flow-in paths.

Figure 5:
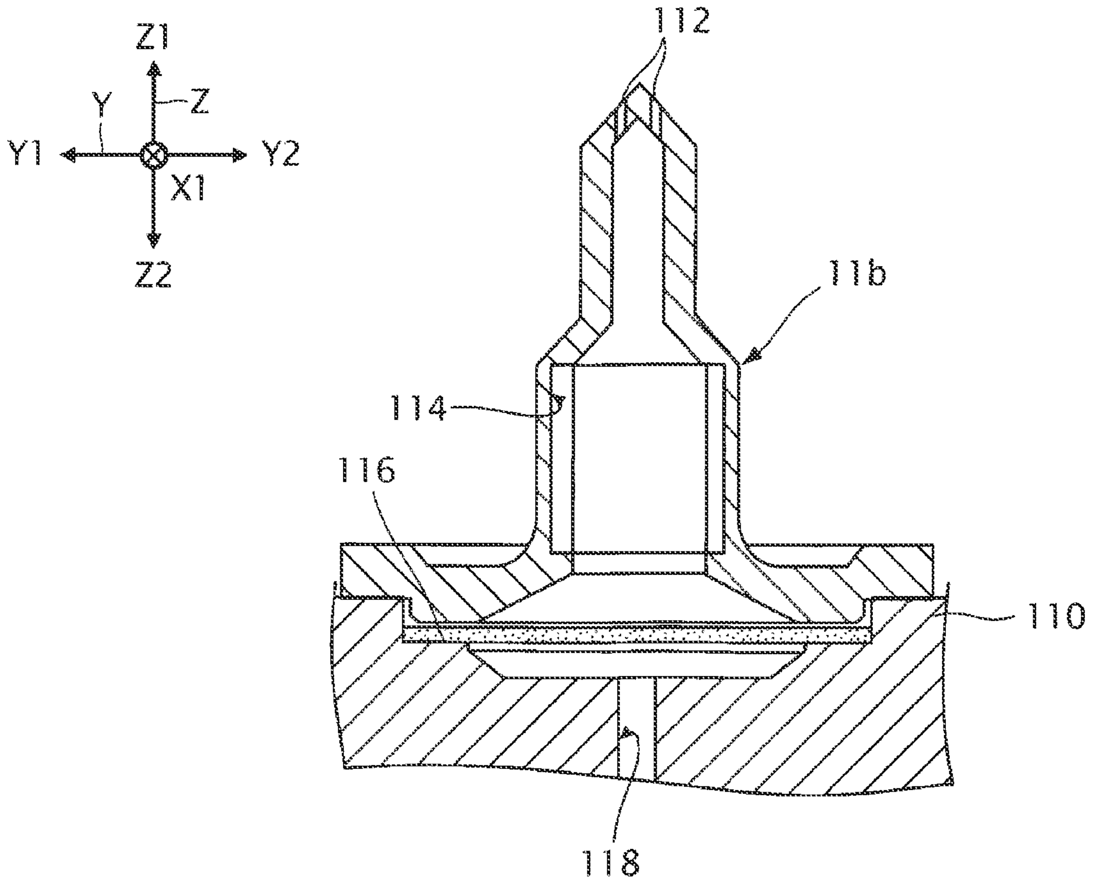
FIG. 5 is a sectional view taken along line V-V in FIG. 4.

FIG. 5 is a sectional view taken along line V-V in FIG. 4. The line V-V is a virtual line parallel to the Y axis and along which the cross-section of the connecting tube 11*b* is taken. The connecting tube 11*b* is a hollow needle-like member having an ink introduction hole 112 and an ink introduction path 114. The ink introduction hole 112 is provided at the end of the connecting tube 11*b* in the Z1 direction and communicates with the ink introduction path 114. The ink introduction path 114 is an inner space of the connecting tube lib. FIG. 5 illustrates the flow path 118 constituting a portion of the flow-in path in the flow path member 110.

The filters 116 are plate-like or sheet-like members that capture foreign substances in the ink while allowing the ink to pass. The filters 116 are provided along the XY plane. The filters 116 are made of, for example, twill-woven or plain-woven metal fibers. Note that the filters 116 do not have to be made of metal fibers and may be made of, for example, resin fibers in the form of, for example, a non-woven fabric.

Although FIG. 5 illustrates the filter 116 provided between the connecting tube 11*b* and the flow-in path, the filter 116 provided between the connecting tube 11*a* and the flow-in path has substantially the same structure as the filter 116 provided between the connecting tube 11*b* and the flow-in path. Herein, "substantially the same" means "completely the same" and "considered to be the same taking into consideration manufacturing errors".

The filters 116 of the heads 10_1 are an example of a "first filter", the filters 116 of the heads 10_2 are an example of a "second filter", and the filters 116 of the heads 10_3 are an example of a "third filter".

Referring back to FIG. 4, the flow path member 110 is formed of multiple plate-like members. By appropriately providing grooves, holes, and the like in the multiple plate-like members, flow paths including the flow-in paths and the flow-out paths are formed. The flow path member 110 is provided with a hole 110*a* into which a connector 12*c* (described below) is inserted. The connecting tubes 11*a*, 11*b*, 11*c*, and 11*d* project from the surface of the flow path member 110 facing the Z1 direction.

The connecting tube 11*a* is a tubular body serving as a flow path through which the first ink is supplied to the flow path member 110, the connecting tube 11*b* is a tubular body serving as a flow path through which the second ink is supplied to the flow path member 110. The connecting tube 11*c* is a tubular body serving as a flow path through which the first ink is discharged from the flow path member 110, and the connecting tube 11*d* is a tubular body serving as a flow path through which the second ink is discharged from the flow path member 110.

The wiring board 12 is a surface-mounted component for electrically coupling the multiple head chips 14 and a collective substrate 16*b* (described below). The wiring board 12 is, for example, a rigid wiring board. The wiring board 12 is disposed between the flow-path structural body 11 and the holder 13 and has the connector 12*c* on the surface thereof facing the flow-path structural body 11. The connector 12*c* is a connecting component to be coupled to the collective substrate 16*b* (described below). The wiring board 12 also has multiple holes 12*a* and openings 12*b*. The holes 12*a* enable connection between the flow-path structural body 11 and the holder 13. The openings 12*b* are holes through which wiring members 14*a* coupling the head chips 14 and the wiring board 12 pass. The wiring members 14*a* are coupled to the surface of the wiring board 12 facing the Z1 direction. The wiring members 14*a* include wires to be electrically coupled to driving elements Ea or Eb (described below) and are, for example, flexible printed circuits (FPC), chip on films (COF), or the like.

The holder 13 is a structural body that accommodates and supports the multiple head chips 14. The holder 13 is made of, for example, resin or metal. The holder 13 has a plate-like shape extending in the directions perpendicular to the Z axis. The holder 13 has multiple ink holes 13*a* and wiring holes 13*b*. The ink holes 13*a* are openings on the flow-path structural body 11 side in the flow paths through which the ink is circulated between the head chips 14 and the flow-path structural body 11. The wiring holes 13*b* are holes through which the wiring members 14*a* coupling the head chips 14 and the wiring board 12 pass. Although not illustrated, the holder 13 has, inside thereof, a flow-in path through which the first ink flows into the head chips 14, a flow-in path through which the second ink flows into the head chips 14, a circulation flow path through which the first ink is circulated from the head chips 14 to the flow-out path of the flow-path structural body 11, and a circulation flow path through which the second ink is circulated from the head chips 14 to the flow-out path of the flow-path structural body 11. Furthermore, although not illustrated, the holder 13 has, inside thereof, branch flow paths for distributing the ink from each ink hole 13*a* to the multiple head chips 14 or for collecting the ink from the multiple head chips 14 to each the ink holes 13*a*. Furthermore, although not illustrated, the holder 13 has, in the surface facing the Z2 direction, multiple recesses for accommodating the multiple head chips 14.

The head chips 14 eject ink. More specifically, although not illustrated in FIG. 4, each head chip 14 has multiple nozzles N for ejecting the first ink, and multiple nozzles N for ejecting the second ink. These nozzles N are provided in a nozzle face FN, which is the surface of the head chip 14 facing the Z2 direction. The configuration of the head chips 14 will be described below. The nozzle faces FN are provided along an XY plane. As described above, the filters 116 are also provided along an XY plane. Accordingly, the filters 116 are provided substantially parallel to the nozzle face FN. Herein, "substantially parallel" means "completely parallel" and "considered to be parallel taking into consideration manufacturing errors".

The fixing plate 15 is a plate member for fixing the multiple head chips 14 to the holder 13. More specifically, the fixing plate 15 is disposed so as to sandwich the multiple head chips 14 between the fixing plate 15 and the holder 13 and is fixed to the holder 13 with an adhesive. The fixing plate 15 is made of, for example, metal. The fixing plate 15 has multiple openings 15*a* through which the nozzles of the multiple head chips 14 are exposed. In the example shown in FIG. 4, the multiple openings 15*a* are provided so as to correspond to the head chips 14. Alternatively, one opening 15*a* may be shared by two or more head chips 14.

The base 16 is a member for fixing the flow-path structural body 11, the wiring board 12, the holder 13, the multiple head chips 14, and the fixing plate 15 to the head fixing substrate 9. The base 16 includes a body 16*a*, the collective substrate 16*b*, and a cover 16*c*.

The body 16*a* holds the flow-path structural body 11 and the wiring board 12 disposed between the base 16 and the holder 13 by being fixed to the holder 13 with screws or the like. The body 16*a* is made of, for example, resin. The body 16*a* has a plate-like portion facing the flow path member 110. The plate-like portion has multiple holes 16*d* into which the connecting tubes 11*a*, 11*b*, 11*c*, and 11*d* are inserted. Furthermore, the body 16*a* has a portion extending in the Z2 direction from the plate-like portion. The portion has, at the distal end thereof, a flange 16*e* to be fixed to the head fixing substrate 9.

The collective substrate 16*b* is a surface-mounted component that electrically couples the control unit 90 and the wiring board 12. The collective substrate 16*b* is, for example, a rigid wiring board. The cover 16*c* is a plate-like member that protects the collective substrate 16*b* and via which the collective substrate 16*b* is fixed to the body 16*a*. The cover 16*c* is made of, for example, resin and is fixed to the body 16*a* with screws or the like.

1.4. Head Chips 14

Figure 6:
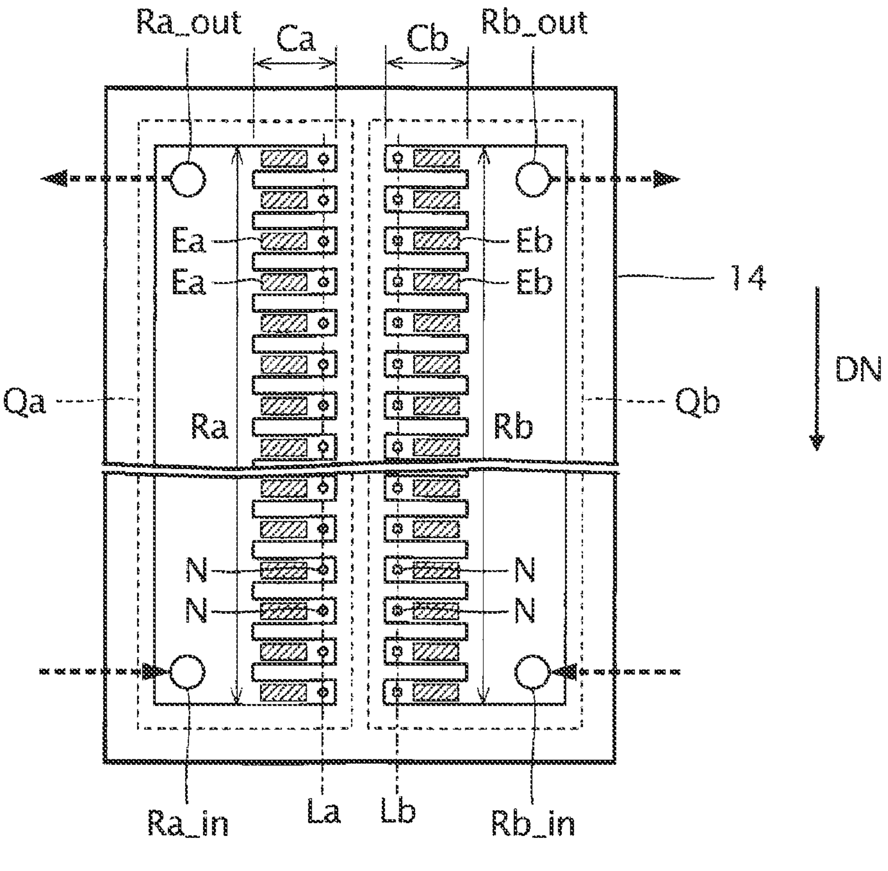
FIG. 6 is a plan view of a head chip 14.

FIG. 6 is a plan view of a head chip 14. FIG. 6 schematically illustrates the internal structure of the head chip 14 as viewed in the Z1 direction. As shown in FIG. 6, the head chip 14 has a liquid ejection portion Qa and a liquid ejection portion Qb. The liquid ejection portion Qa has a nozzle row La formed of multiple nozzles N, through which the first ink supplied from the circulation mechanism 94 is ejected. The liquid ejection portion Qb includes a nozzle row Lb formed of multiple nozzles N, through which the second ink supplied from the circulation mechanism 94 is ejected. The multiple nozzles N in the nozzle row La and the nozzle row Lb are arranged along the direction DN.

The liquid ejection portion Qa includes a common liquid chamber Ra, multiple pressure chambers Ca, and multiple driving elements Ea. The common liquid chamber Ra continuously extends over the multiple nozzles N in the nozzle row La. The pressure chamber Ca and the driving element Ea are provided for each of the nozzles N in the nozzle row La. The pressure chambers Ca are spaces communicating with the nozzles N. The multiple pressure chambers Ca are filled with the first ink supplied from the common liquid chamber Ra. The driving elements Ea change the pressure of the first ink in the pressure chambers Ca. The driving elements Ea are, for example, piezoelectric elements that change the volume of the pressure chambers Ca by deforming the walls of the pressure chambers Ca or heat-generating elements that generate bubbles in the pressure chambers Ca by heating the first ink in the pressure chambers Ca. As a result of the driving elements Ea being driven by a driving signal Com and changing the pressure of the first ink inside the pressure chambers Ca, the first ink in the pressure chambers Ca is ejected from the nozzles N.

The liquid ejection portion Qb has, similarly to the liquid ejection portion Qa, a common liquid chamber Rb, multiple pressure chambers Cb, and multiple driving elements Eb. The common liquid chamber Rb continuously extends over the multiple nozzles N in the nozzle row Lb. The pressure chamber Cb and the driving element Eb are provided for each of the nozzles N in the nozzle row Lb. The multiple pressure chambers Cb are filled with the second ink supplied from the common liquid chamber Rb. The driving elements Eb are, for example, the piezoelectric elements or the heat-generating elements. As a result of the driving elements Eb being driven by a driving signal Com and changing the pressure of the second ink in the pressure chambers Cb, the second ink in the pressure chambers Cb is ejected from the nozzles N.

As shown in FIG. 6, the head chip 14 has an introduction port Ra_in, a discharge port Ra_out, an introduction port Rb_in, and a discharge port Rb_out. The introduction port Ra_in and the discharge port Ra_out communicate with the common liquid chamber Ra. The introduction port Rb_in and the discharge port Rb_out communicate with the common liquid chamber Rb. Hereinbelow, the introduction port Ra_in and the introduction port Rb_in will be collectively referred to as the introduction ports R_in. The discharge port Ra_out and the discharge port Rb_out will be collectively referred to as the discharge ports R_out.

In this head chip 14, the first ink stored in the common liquid chamber Ra without being ejected from the nozzles N in the nozzle row La circulates through the discharge port Ra_out, a first-ink circulation flow path in the holder 13, a first-ink flow-out path in the flow-path structural body 11, the reservoir 93 for the first ink in the circulation mechanism 94, a first-ink flow-in path in the flow-path structural body 11, a first-ink flow-in path in the holder 13, the introduction port Ra_in, and the common liquid chamber Ra_in this order. Similarly, the second ink stored in the common liquid chamber Rb without being ejected from the nozzles N in the nozzle row Lb circulates through the discharge port Rb_out, a second-ink circulation flow path in the holder 13, a second-ink flow-out path in the flow-path structural body 11, the reservoir 93 for the second ink in the circulation mechanism 94, a second-ink flow-in path in the flow-path structural body 11, a second-ink flow-in path in the holder 13, the introduction port Rb_in, and the common liquid chamber Rb_in this order.

1.5. Bubbles in Ink

When bubbles are formed in the ink, the ink supply becomes insufficient, or defective ejection occurs. Defective ejection is a state in which, even when the ink is to be ejected from the nozzles N in accordance with a driving signal Com, the ink cannot be ejected in accordance with the manner specified by the driving signal Com. Herein, the ink ejection manner specified by the driving signal Com is a manner in which the ink is ejected from the nozzles N by the amount and at the ejection speed specified by the waveform of the driving signal Com. More specifically, the state in which the ink cannot be ejected in accordance with the ink ejection manner specified by the driving signal Com includes, besides the state in which the ink cannot be ejected from the nozzles N: a state in which the amount of ink ejected from the nozzles N is smaller than the amount of ink specified by the driving signal Com; a state in which the amount of ink ejected from the nozzles N is greater than the amount of ink specified by the driving signal Com; and a state in which the ink is ejected at a speed different from the ink ejection speed specified by the driving signal Com and thus cannot land on a desired landing position on the medium PP.

The bubbles in the ink can be discharged by the circulation cleaning. However, because the arrangement angle of the heads 10 included in the head module 3_1 and the arrangement angle of the heads 10 included in the head module 3_2 are different, the bubble discharging levels vary. The reasons why the bubble discharging level varies with the arrangement angle of the heads 10 include the presence of the filters 116 and the difference in height in the z-axis direction between the introduction ports R_in and the discharge ports R_out. The reasons will be described below in sequence.

1.5.1. Reason why Bubble Discharging Level is Varied by Filter 116

Figure 7:
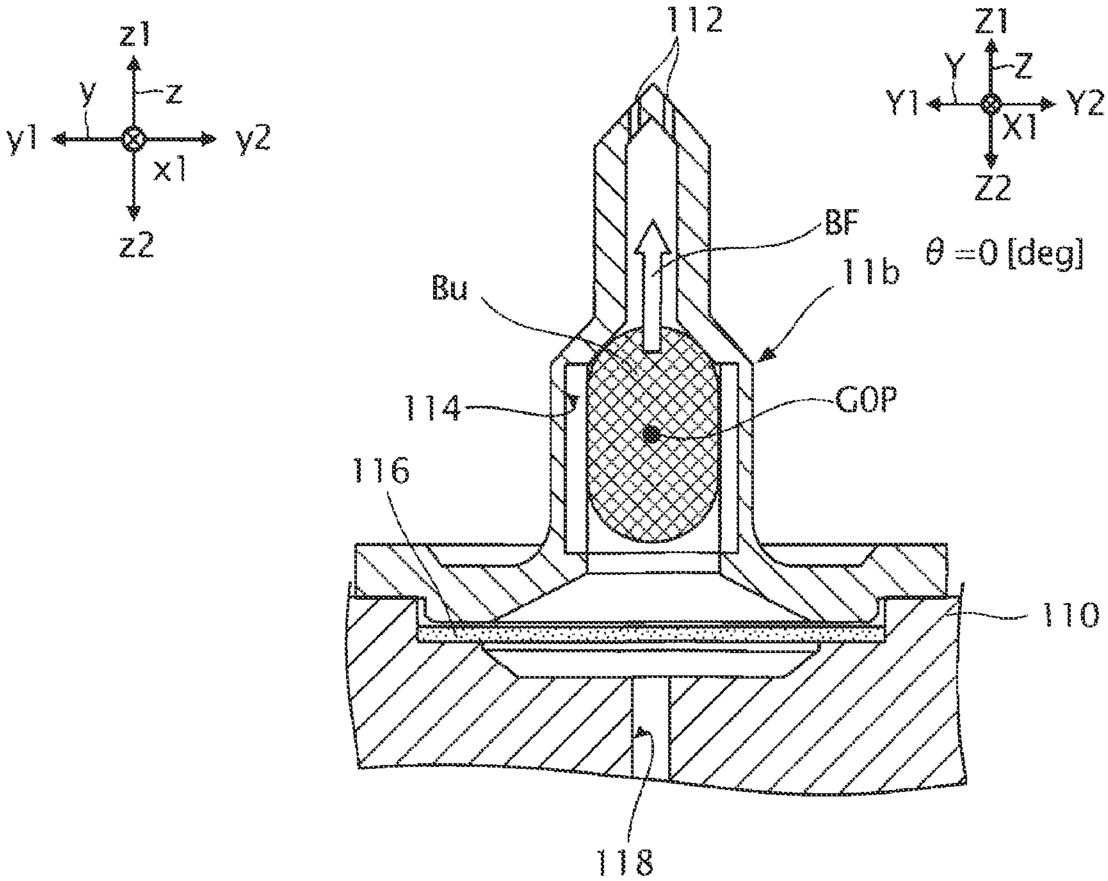
FIG. 7 illustrates a state of the filter 116 and the vicinity thereof when the arrangement angle θ is 0° and when printing processing is being performed.
Figure 8:
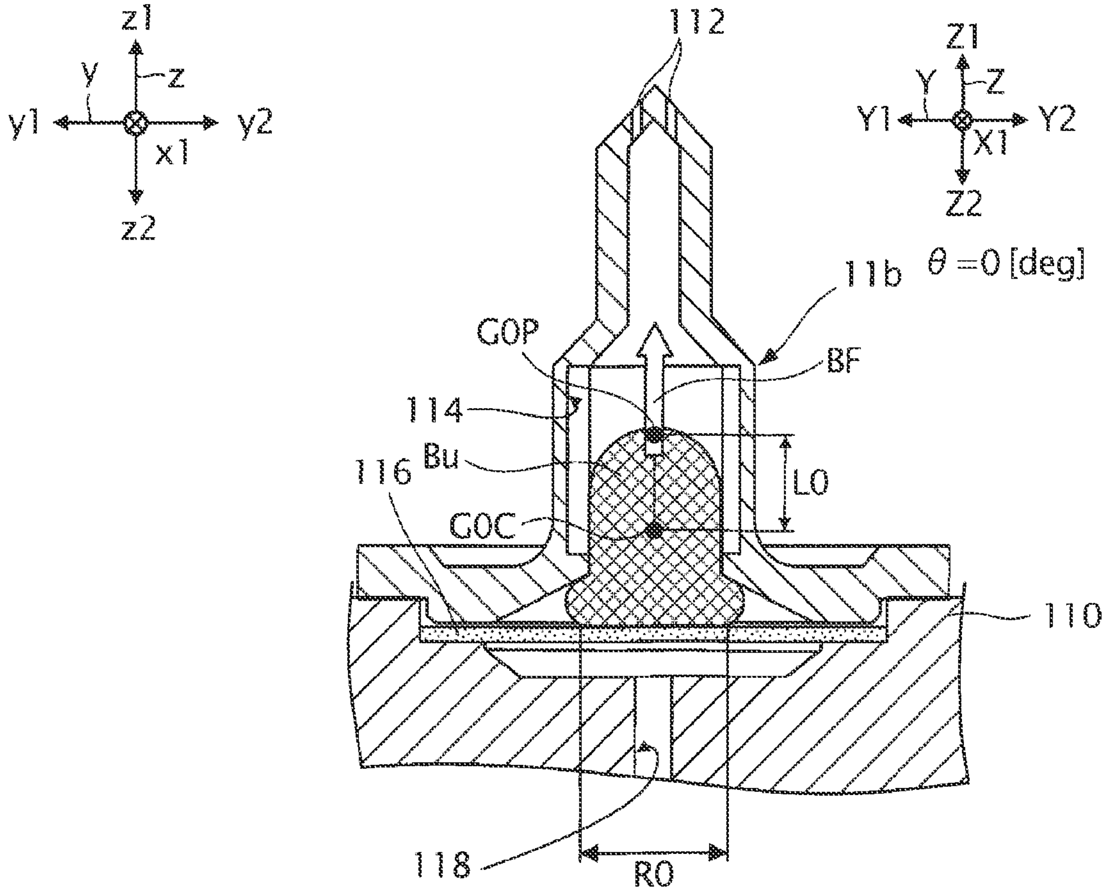
FIG. 8 illustrates a state of the filter 116 and the vicinity thereof when the arrangement angle θ is 0° and when circulation cleaning is being performed.

FIG. 7 illustrates a state of the filter 116 and the vicinity thereof when the arrangement angle θ is 0° and when the printing processing is being performed. FIG. 8 illustrates a state of the filter 116 and the vicinity thereof when the arrangement angle θ is 0° and when the circulation cleaning is being performed. As shown in FIGS. 7 and 8, a bubble Bu is formed in the ink introduction path 114. In the printing processing, when the bubble Bu flows into the flow-in path of the flow-path structural body 11 and approaches the nozzles N, defective ejection is likely to occur. Hence, it is desirable that the bubble Bu be away from the filter 116 during the printing processing. As shown in FIG. 7, the bubble Bu is located away from the filter 116 in the z1 direction. FIG. 7 shows the center of gravity G0P of the bubble Bu when the arrangement angle θ is 0° and when the printing processing is being performed. The center of gravity is the point where the sum of the cross-sectional first-order moments is zero in the target shape.

In the circulation cleaning, because the bubble Bu is discharged in the Z2 direction, the bubble Bu needs to be in contact with the filter 116. In the example shown in FIG. 8, because the ink flows in the Z2 direction with a greater flow rate than in the printing processing due to the circulation cleaning, the bubble Bu moves in the Z2 direction. FIG. 8 shows the center of gravity G0C of the bubble Bu when the arrangement angle θ is 0° and when the circulation cleaning is being performed. Note that, as shown in FIGS. 7 and 8, the bubble Bu is subjected to a buoyant force BF directed in the z1 direction. In the example shown in FIG. 8, because the Z2 direction and the z1 direction are parallel and opposite to each other, the buoyant force BF is cancelled by the flow of the ink. As shown in FIG. 8, the distance of movement of the bubble Bu when the arrangement angle θ is 0° is the distance LO. The bubble Bu moves in the Z2 direction and comes into contact with the filter 116. The contact area between the bubble Bu and the filter 116 is an area RO in the example shown in FIG. 8.

Figure 9:
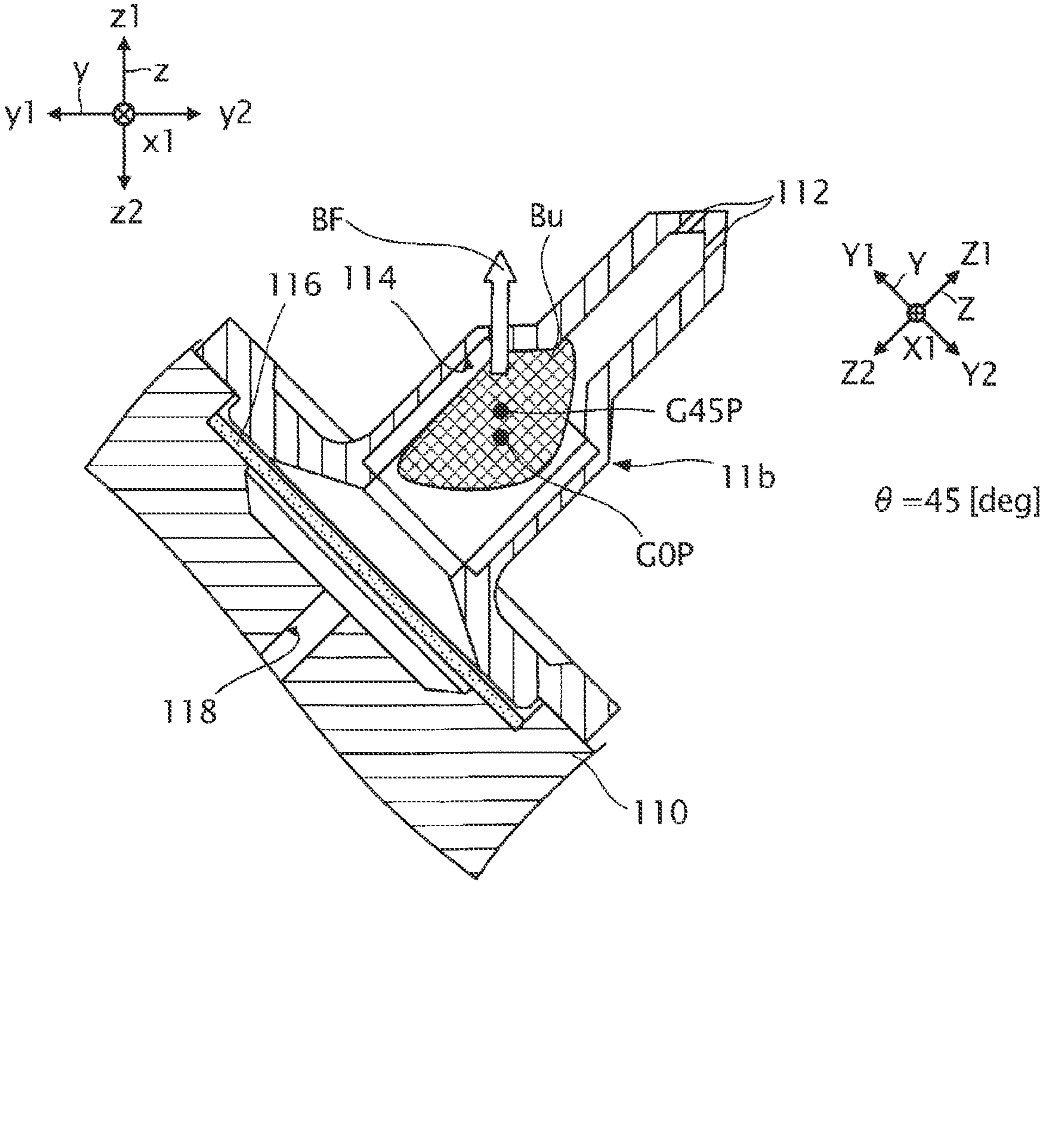
FIG. 9 illustrates a state of the filter 116 and the vicinity thereof when the arrangement angle θ is 45° and when the printing processing is being performed.
Figure 10:
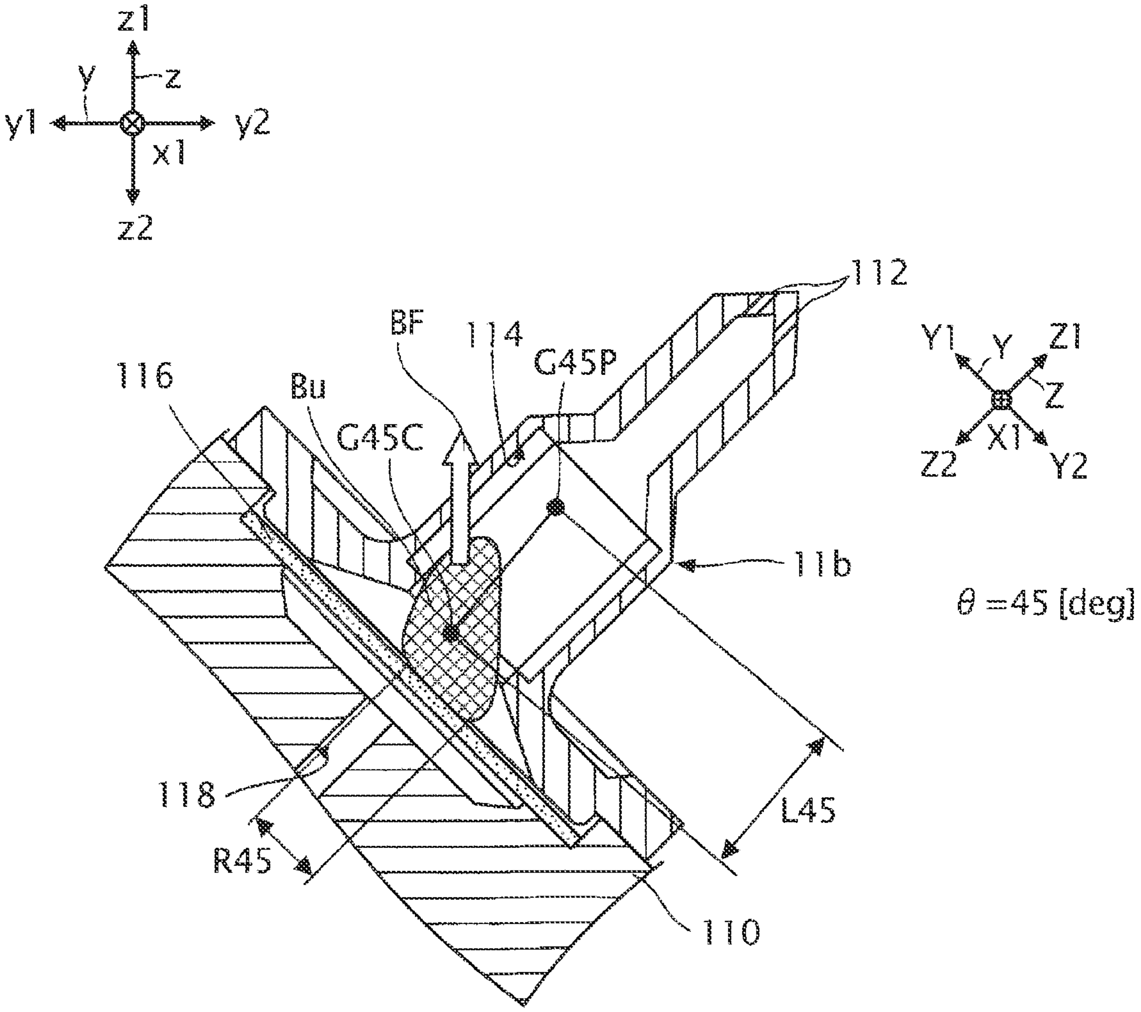
FIG. 10 illustrates a state of the filter 116 and the vicinity thereof when the arrangement angle θ is 45° and when the circulation cleaning is being performed.

FIG. 9 illustrates a state of the filter 116 and the vicinity thereof when the arrangement angle θ is 45° and when the printing processing is being performed. FIG. 10 illustrates a state of the filter 116 and the vicinity thereof when the arrangement angle θ is 45° and when the circulation cleaning is being performed. As shown in FIG. 9, in the printing processing, compared with the aspect in which the arrangement angle θ is 0°, the bubble Bu moves in the z1 direction due to the buoyant force BF. FIG. 9 shows the center of gravity G45P of the bubble Bu when the arrangement angle θ is 45° and when the printing processing is being performed. As shown in FIG. 9, the center of gravity G45P is located further on the z1 direction side than the center of gravity G0P.

FIG. 10 shows the center of gravity G45C of the bubble Bu when the arrangement angle θ is 45° and when the circulation cleaning is being performed. As shown in FIG. 10, although the flow of the ink in the Z2 direction moves the bubble Bu in the Z2 direction, the bubble Bu is subjected to a buoyant force BF directed in the z1 direction. In the example shown in FIG. 10, the ink flow direction and the direction of the buoyant force BF intersect with each other. Accordingly, although the component of the buoyant force BF in the Z1 direction is cancelled by the flow of the ink, the component of the buoyant force BF in the Y2 direction is not cancelled by the flow of the ink. As shown in FIG. 10, the distance of movement of the bubble Bu moves when the arrangement angle θ is 45° is the distance L45. As a result of the center of gravity G45P having moved further in the z1 direction than the center of gravity G0P, the distance L45 is greater than the distance LO. A greater distance to be moved requires a greater flow rate. Accordingly, the control unit 90 sets the circulation-cleaning flow rate when the arrangement angle θ is 45° to a value greater than the circulation-cleaning flow rate when the arrangement angle θ is 0°.

The bubble Bu moves in the Z2 direction and comes into contact with the filter 116. In the example shown in FIG. 10, the contact area between the bubble Bu and the filter 116 is an area R45. Because the component of the buoyant force BF in the Y1 direction is not cancelled by the flow of the ink, the bubble Bu moves in the Y2 and is elongated in the Z-axis direction, which is perpendicular to the Y1 direction, compared with the bubble Bu when the arrangement angle θ is 0°. Because the width of the bubble Bu in the Y-axis direction decreases as the length in the Z-axis direction increases, the area R45 is smaller than the area RO. In response to the decrease in the contact area between the bubble Bu and the filter 116, the control unit 90 sets a longer circulation-cleaning period, compared with the case where the arrangement angle θ is 0°.

Figure 11:
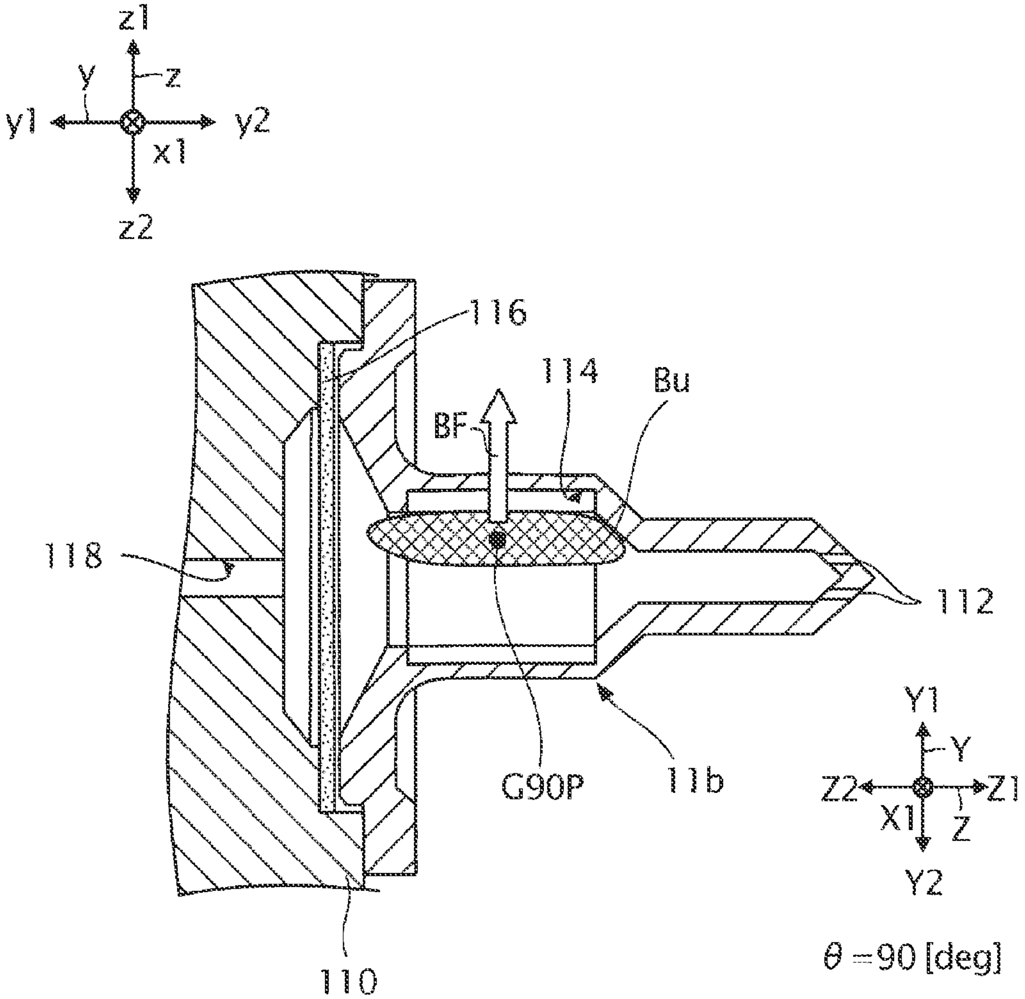
FIG. 11 illustrates a state of the filter 116 and the vicinity thereof when the arrangement angle θ is 90° and when the printing processing is being performed.
Figure 12:
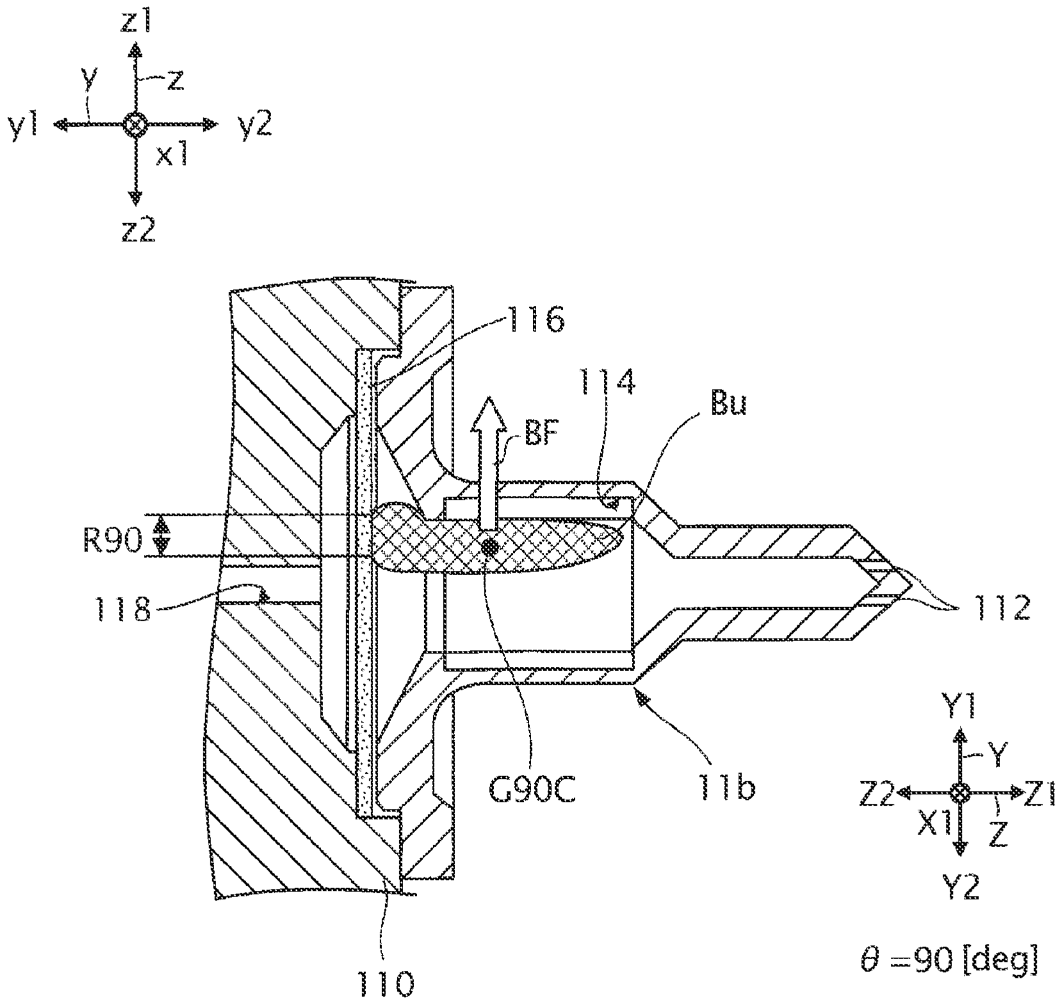
FIG. 12 illustrates a state of the filter 116 and the vicinity thereof when the arrangement angle θ is 90° and when the circulation cleaning is being performed.

FIG. 11 illustrates a state of the filter 116 and the vicinity thereof when the arrangement angle θ is 90° and when the printing processing is being performed. FIG. 12 illustrates a state of the filter 116 and the vicinity thereof when the arrangement angle θ is 90° and when the circulation cleaning is being performed. FIG. 11 shows the center of gravity G90P of the bubble Bu when the arrangement angle θ is 90° and when the printing processing is being performed. FIG. 12 shows the center of gravity G90C of the bubble Bu when the arrangement angle θ is 90° and when the circulation cleaning is being performed. In the circulation cleaning, the bubble Bu moves in the Z2 direction and comes into contact with the filter 116. In the example in FIG. 12, the contact area between the bubble Bu and the filter 116 is an area R90.

As shown in FIG. 12, although the flow of the ink in the Z2 direction moves the bubble Bu in the Z2 direction, a buoyant force BF directed in the z1 direction is subjected to the bubble Bu. In the example shown in FIG. 12, the ink flow direction and the direction of the buoyant force BF are perpendicular to each other. Hence, the buoyant force BF is not cancelled by the flow of the ink. In other words, the buoyant force BF has no effect on the flow of the ink. Accordingly, when the arrangement angle θ is 90°, the circulation-cleaning flow rate may be almost the same level as the circulation-cleaning flow rate when the arrangement angle θ is 0°.

Because the buoyant force BF is not cancelled by the flow of the ink, the bubble Bu moves in the Y1 direction and is elongated in the Z-axis direction, which is perpendicular to the Y1 direction, compared with the bubble Bu when the arrangement angle θ is 45°. Because the width of the bubble Bu in the Y axis decreases as the length in the Z-axis direction increases, the area R90 is smaller than the area R45. In response to the decrease in the contact area between the bubble Bu and the filter 116, the control unit 90 sets a longer circulation-cleaning period, compared with the case where the arrangement angle θ is 45°.

Figure 13:
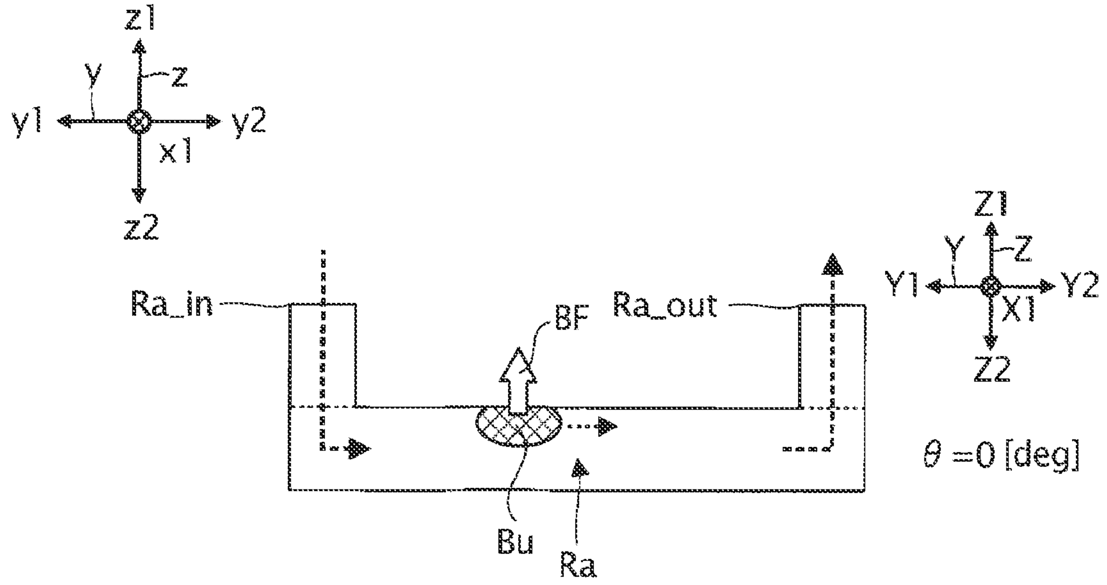
FIG. 13 illustrates a state of a common liquid chamber Ra when the arrangement angle θ is 0°.
Figure 14:
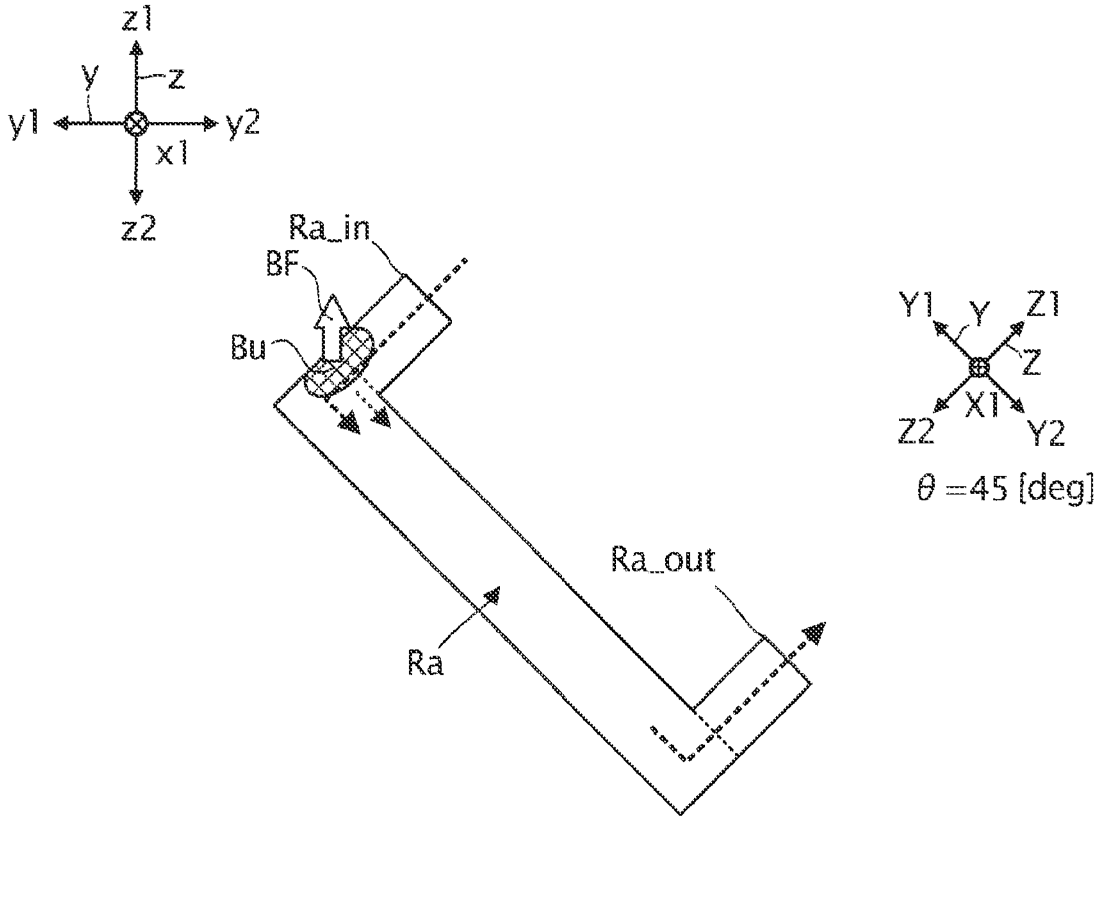
FIG. 14 illustrates a state of the common liquid chamber Ra when the arrangement angle θ is 45°.
Figure 15:
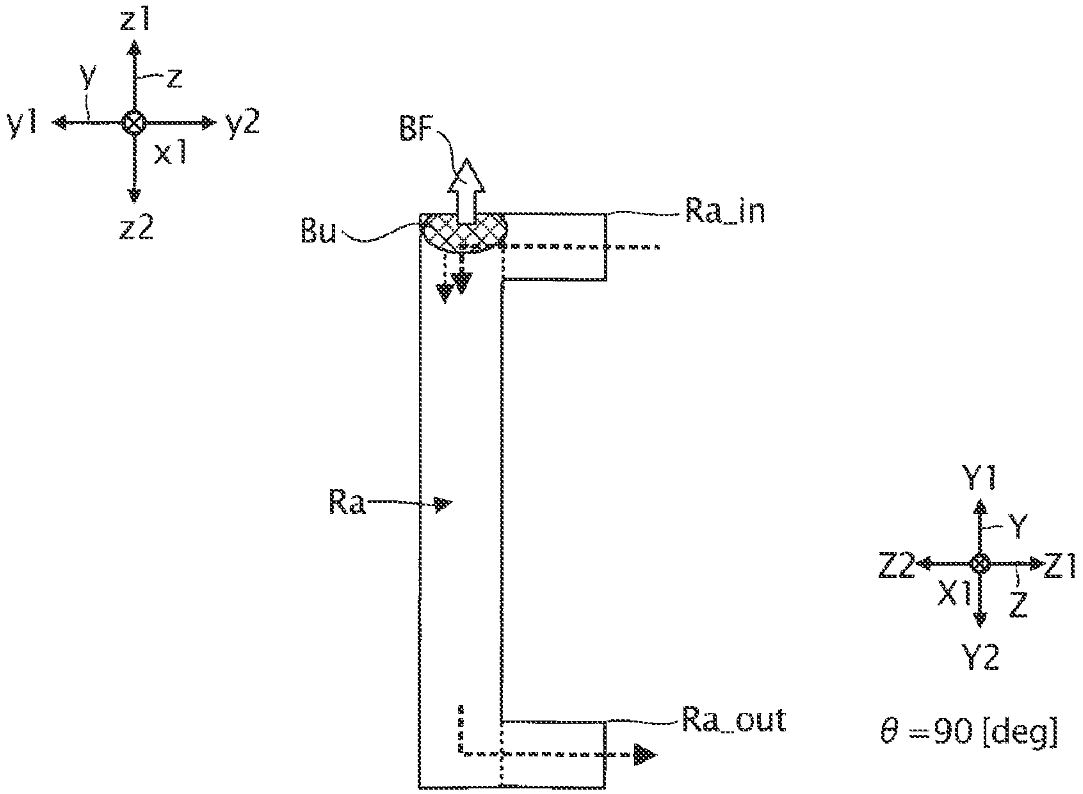
FIG. 15 illustrates a state of the common liquid chamber Ra when the arrangement angle θ is 90°.

1.5.2. Reason why Bubble Discharging Level is Varied by Difference in Height Between Introduction Port R_in and Discharge Port R_Out in z-Axis Direction FIG. 13 illustrates a state of the common liquid chamber Ra when the arrangement angle θ is 0°. FIG. 14 illustrates a state of the common liquid chamber Ra when the arrangement angle θ is 45°. FIG. 15 illustrates a state of the common liquid chamber Ra when the arrangement angle θ is 90°. Although FIGS. 13, 14, and 15 show the states of the common liquid chamber Ra, the states of the common liquid chamber Rb are substantially the same as the states of the common liquid chamber Ra. As shown in FIGS. 13, 14, and 15, a bubble Bu is formed in the common liquid chamber Ra.

When the head 10 is inclined with respect to the horizontal plane SF, and thus, the introduction port Ra_in is located to the z1 direction side of the discharge port R_out, the direction in which the bubble Bu is discharged, that is, the ink flow direction, gets closer to the z2 direction as the arrangement angle θ increases. Because the direction of the buoyant force BF is the z1 direction, the force applied to the direction opposite to the direction in which the bubble Bu is discharged increases due to the buoyant force BF, as the arrangement angle θ increases. Accordingly, as the arrangement angle θ increases, the buoyant force BF serves more as a drag on the bubble Bu to be discharged, making it difficult to discharge the bubble Bu. Therefore, the control unit 90 increases the circulation-cleaning flow rate and sets a longer circulation-cleaning period in response to an increase in the arrangement angle θ.

1.6. Example Circulation Cleaning Flow Rates and Circulation Cleaning Periods FIG. 16 is a table showing example circulation-cleaning flow rates and circulation-cleaning periods. The table T1 shown in FIG. 16 has records 160_1 to 160_6. The storage unit 91 stores the table T1.

FIG. 16 shows example circulation-cleaning flow rates, circulation-cleaning periods, and total flow rates when the arrangement angle θ is 0°, 30°, 45°, 60°, 75°, and 90°. The total flow rate means the amount of ink during the circulation cleaning and is obtained by multiplying the circulation-cleaning flow rate by the circulation-cleaning period. The storage unit 91 may not store the total flow rate in the table T1. The unit of the circulation-cleaning flow rate shown in FIG. 16 is [g/s], which represents a so-called mass flow rate.

The record 160_1 indicates that, when the arrangement angle θ is 0°, the circulation-cleaning flow rate is 1.5 [g/s], the circulation-cleaning period is 30 seconds, and the total flow rate is 45 [g]. The record 160_2 indicates that, when the arrangement angle θ is 30°, the circulation-cleaning flow rate is 1.8 [g/s], the circulation-cleaning period is 60 seconds, and the total flow rate is 108 [g]. The record 160_3 indicates that, when the arrangement angle θ is 45°, the circulation-cleaning flow rate is 1.9 [g/s], the circulation-cleaning period is 90 seconds, and the total flow rate is 171 [g]. The record 160_4 indicates that, when the arrangement angle θ is 60°, the circulation-cleaning flow rate is 2 [g/s], the circulation-cleaning period is 120 seconds, and the total flow rate is 240 [g]. The record 160_5 indicates that, when the arrangement angle θ is 75°, the circulation-cleaning flow rate is 1.5 [g/s], the circulation-cleaning period is 180 seconds, and the total flow rate is 270 [g]. The record 160_6 indicates that, when the arrangement angle θ is 90°, the circulation-cleaning flow rate is 1.5 [g/s], the circulation-cleaning period is 180 seconds, and the total flow rate is 270 [g].

As the arrangement angle θ increases, the bubble discharging level decreases. Accordingly, as shown in FIG. 16, the total flow rate monotonically increases with the increase in the arrangement angle θ, when the arrangement angle θ is from 0° to 75°. The circulation-cleaning flow rate monotonically increases with the increase in the arrangement angle θ, when the arrangement angle θ is from 0° to 60°, and monotonically decreases with increase in the arrangement angle θ, when the arrangement angle θ is from 60° to 75°. Furthermore, as shown in table T1, the circulation-cleaning flow rate when the arrangement angle θ is from 30° to 60° is greater than the circulation-cleaning flow rate when the arrangement angle θ is 0°. The circulation-cleaning period monotonically increases with the increase in the arrangement angle θ when the arrangement angle θ is from 0° to 75°.

The total circulation-cleaning flow rate in the heads 10_1 is an example of a "first amount". The circulation-cleaning flow rate in the heads 10_1 is an example of a "first flow rate". The circulation-cleaning period in the heads 10_1 is an example of a "first period". The total circulation-cleaning flow rate in the heads 10_2 is an example of a "second amount". The circulation-cleaning flow rate in the heads 10_2 is an example of a "second flow rate". The circulation-cleaning period in the heads 10_2 is an example of a "second period". The total circulation-cleaning flow rate in the heads 10_3 is an example of a third amount". The circulation-cleaning flow rate in the heads 10_3 is an example of a "third flow rate". The circulation-cleaning period for the heads 10_3 is an example of a "third period".

1.7. Circulation Cleaning Operation

The control unit 90 performs the circulation cleaning of the heads 10_1, the circulation cleaning of the heads 10_2, and the circulation cleaning of the heads 10_3 in parallel. For example, when the control unit 90 is a multiprocessor and has three or more processors, each of the three processors of the control unit 90 may perform the circulation cleaning of any of the heads 10_1 to 10_3. When the control unit 90 has one processor, processing for performing the circulation cleaning of the heads 10_1, processing for performing the circulation cleaning of the heads 10_2, and processing for performing the circulation cleaning of the heads 10_3 are switched every predetermined period of time. The operation in the circulation cleaning of the heads 10_1 will be described with reference to FIG. 17. Because the operation in the circulation cleaning of the heads 10_2 and the operation in the circulation cleaning of the heads 10_3 are substantially the same as the operation in the circulation cleaning of the heads 10_1, the description thereof will be omitted.

Figure 17:
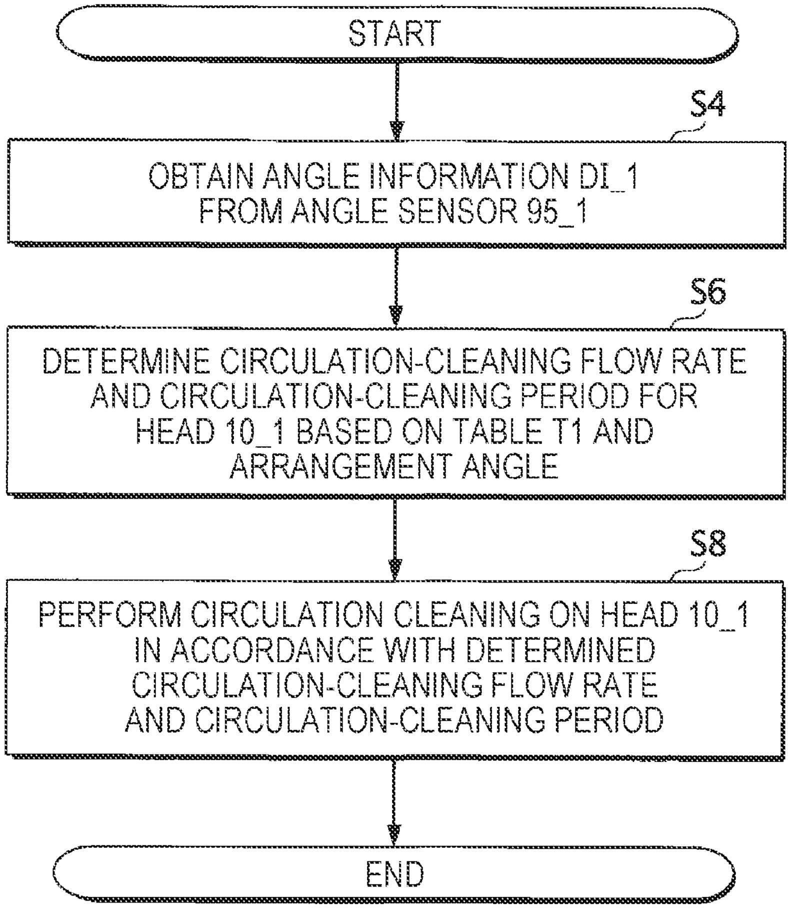
FIG. 17 is a flowchart showing the operation in the circulation cleaning of heads 10_1.

FIG. 17 is a flowchart showing the operation in the circulation cleaning of the heads 10_1.

In step S4, the control unit 90 obtains angle information DI_1 from the angle sensor 95_1. Then, in step S6, the control unit 90 determines the circulation-cleaning flow rate and the circulation-cleaning period for the heads 10_1 based on the table T1 and the arrangement angle θ indicated by the angle information DI_1. More specifically, the control unit 90 determines whether the arrangement angle θ indicated by the angle information DI_1 is recorded on the table T1. When the arrangement angle θ indicated by the angle information DI_1 is recorded on the table T1, the control unit 90 determines the circulation-cleaning flow rate and the circulation-cleaning period corresponding to the recorded arrangement angle θ as the circulation-cleaning flow rate and the circulation-cleaning period for the heads 10_1. When the arrangement angle θ indicated by the angle information DI_1 is not recorded on the table T1, the control unit 90 performs an interpolation process based on the circulation-cleaning flow rate and the circulation-cleaning period corresponding to an arrangement angle θ, among the multiple arrangement angles θ recorded on the table T1, that is close to the arrangement angle θ indicated by the angle information DI_1 to determine the circulation-cleaning flow rate and the circulation-cleaning period for the heads 10_1. The interpolation process includes, for example, linear interpolation and third-order spline interpolation.

After the processing in step S6 is completed, in step S8, the control unit 90 performs the circulation cleaning on the multiple heads 10_1 in the head module 3_1 in accordance with the determined circulation-cleaning flow rate and circulation-cleaning period. After the processing in step S8 is completed, the control unit 90 terminates the process in FIG. 17.

The control unit 90 may successively perform the circulation cleaning of the heads 10_1, the circulation cleaning of the heads 10_2, and the circulation cleaning of the heads 10_3.

1.8. Summary of First Embodiment

As described above, the liquid ejecting apparatus 100 includes the heads 10_1, the heads 10_2, the reservoir 93_1, the reservoir 93_2, the circulation mechanism 94_1, the circulation mechanism 94_2, and the control unit 90. The heads 10_1 include nozzle faces FN 1 having multiple nozzles N through which ink is ejected and are disposed such that the angle between the nozzle faces FN 1 and the horizontal plane SF is the arrangement angle θ1. The heads 10_2 include nozzle faces FN_2 having multiple nozzles N through which ink is ejected and are disposed such that the angle between the nozzle faces FN_2 and the horizontal plane SF is the arrangement angle θ2, which is greater than the arrangement angle θ1. The reservoir 93_1 stores ink to be supplied to the heads 10_1. The reservoir 93_2 stores ink to be supplied to the heads 10_2. The circulation mechanism 94_1 circulates ink between the reservoir 93_1 and the heads 10_1. The circulation mechanism 94_2 circulates ink between the reservoir 93_2 and the heads 10_2. The control unit 90 controls the circulation mechanism 94_1 and the circulation mechanism 94_2. The control unit 90 performs the circulation cleaning, in which ink is circulated through the multiple heads 10, including the heads 10_1 and the heads 10_2. The total circulation-cleaning flow rate in the heads 10_2 is greater than the total circulation-cleaning flow rate in the heads 10_1.

As the arrangement angle θ increases, the bubble discharging level decreases. Hence, according to the first embodiment, by increasing the total circulation-cleaning flow rate with the increase in the arrangement angle θ, it is possible to appropriately discharge the bubbles in the heads 10. Hence, according to the first embodiment, because it is possible to appropriately discharge the bubbles in the heads 10_2, compared with an aspect in which the circulation cleaning is performed on the heads 10_2 with the total circulation-cleaning flow rate for the heads 10_1, it is possible to suppress shortage of ink to be supplied to the heads 10_2 and defective ejection. Furthermore, when the ink is excessively circulated through the heads 10, the risk of leakage of the ink from, for example, connecting portions of flow paths in the heads 10 increases, reducing the life of the heads 10. According to the first embodiment, because it is possible to suppress excessive ink circulation in the heads 10_1 compared with an aspect in which the circulation cleaning is performed on the heads 10_1 with the total circulation-cleaning flow rate for the heads 10_2, it is possible to increase the life of the heads 10_1. Furthermore, because there is no need to change the structures of the heads 10_1 and the heads 10_2 to achieve uniform bubble discharging level between the heads 10_1 and the heads 10_2, which are disposed at different arrangement angles θ, the same structure may be used in the heads 10_1 and the heads 10_2, which reduces the production cost.

The circulation-cleaning flow rate in the heads 10_1 is lower than the circulation-cleaning flow rate in the heads 10_2. More specifically, the control unit 90 sets a higher circulation-cleaning flow rate for a larger arrangement angle θ in the range of 0° to less than 70°.

As described above, the presence of the filters 116 is one reason of the varying bubble discharging level, and the distance between the bubbles and the filters 116 changes depending on the arrangement angle θ. Accordingly, it is possible to appropriately discharge the bubbles in the heads 10 by setting a higher circulation-cleaning flow rate for a larger arrangement angle θ in the range of 0° to less than 70°. According to the first embodiment, it is possible to appropriately discharge the bubbles in the heads 10_1, compared with an aspect in which the circulation-cleaning flow rate for the heads 10_2 is set for the heads 10_1. Furthermore, in order to increase the flow rate while maintaining the shape of the flow path, typically, the ink pressure is increased. In the aspect in which the circulation-cleaning flow rate for the heads 10_2 is set for the heads 10_1, high-pressure ink circulates through the heads 10_1, reducing the life of the heads 10_1. Accordingly, in this embodiment, it is possible to increase the life of the heads 10_1, compared with an aspect in which the circulation-cleaning flow rate for the heads 10_2 is set for the heads 10_1.

Typically, the flow rate Q [g/s] is expressed by Expression (1) below:

$$Q = A \times V \times \rho \quad (1)$$

Note that A represents the sectional area [$m^2$] of the tube through which the liquid circulates, V represents the flow speed [m/s], and ρ represents the liquid density [$g/m^3$]. The sectional area A and the density ρ do not significantly change with the change in the arrangement angle θ. Accordingly, from Expression (1), the greater the flow rate Q is, the higher the flow speed is. Thus, in the first embodiment, the flow speed during the circulation cleaning is set to be high in response to an increase in the arrangement angle θ.

The circulation-cleaning period for the heads 10_2 is longer than the circulation-cleaning period for the heads 10_1.

As described above, as the arrangement angle θ increases, the contact area between the bubble Bu and the filter 116 decreases, and, in the common liquid chamber Ra, the buoyant force BF serves more as a drag on the bubble Bu to be discharged. Accordingly, by setting a longer circulation-cleaning period for a larger arrangement angle θ, it is possible to appropriately discharge the bubbles in the heads 10. In general, as the circulation-cleaning period increases, the moisture in ink evaporates, increasing the ink viscosity. Increased ink viscosity tends to cause defective ejection. Hence, according to the first embodiment, it is possible to suppress an increase in the ink viscosity in the heads 10_1, compared with an aspect in which the circulation-cleaning period for the heads 10_2 is set for the heads 10_1.

The liquid ejecting apparatus 100 further includes the heads 10_3, the reservoir 93_3, and the circulation mechanism 94_3. The heads 10_3 include nozzle faces FN 3 having multiple nozzles N through which ink is ejected and are disposed such that the angle between the nozzle faces FN 3 and the horizontal plane SF is an arrangement angle θ3, which is greater than the arrangement angle θ2. The reservoir 93_3 stores ink to be supplied to the heads 10_3. The circulation mechanism 94_3 circulates ink between the reservoir 93_3 and the heads 10_3. The control unit 90 controls the circulation mechanism 94_3. The total circulation-cleaning flow rate in the heads 10_3 is greater than the total circulation-cleaning flow rate in the heads 10_2.

According to the first embodiment, it is possible to appropriately discharge the bubbles in the heads 10_3.

The circulation-cleaning flow rate in the heads 10_3 is lower than the circulation-cleaning flow rate in the heads 10_2.

When the arrangement angle θ3 is large enough, as in the case where the arrangement angle θ3 is 70° or more, it is possible to appropriately discharge the bubbles in the heads 10_3 without increasing the circulation-cleaning flow rate. Hence, according to the first embodiment, it is possible to increase the life of the heads 10_3, compared with an aspect in which the circulation-cleaning flow rate for the heads 10_2 is set for the heads 10_3.

The arrangement angles θ1 and θ2 are both less than 70°. The arrangement angle θ3 is 70° or more.

When the arrangement angles θ1 and θ2 are both less than 70°, it is possible to appropriately discharge the bubbles in the heads 10_1, even when the circulation-cleaning flow rate in the heads 10_1 is set to be lower than the circulation-cleaning flow rate in the heads 10_2.

The heads 10_1 have the filters 116 substantially parallel to the nozzle faces FN 1. The heads 10_2 have the filters 116 substantially parallel to the nozzle faces FN_2. The heads 10_3 have the filters 116 substantially parallel to the nozzle faces FN 3.

As described above, due to the presence of the filters 116 in the heads 10, the level to which the bubbles are discharged from the heads 10 varies with the arrangement angle θ. Hence, according to the first embodiment, by changing the total circulation-cleaning flow rate in accordance with the arrangement angle θ, it is possible to appropriately discharge the bubbles from the heads 10.

The circulation-cleaning period for the heads 10_3 is longer than the circulation-cleaning period for the heads 10_2.

According to the first embodiment, it is possible to appropriately discharge the bubbles in the heads 10_3.

2. Modification

The above-described embodiments can be variously modified. Examples of the modified aspects will be described in detail below. The two or more aspects selected from below may be combined with one another as appropriate as long as they are not contradictory to one another.

2.1. First Modification

In the first embodiment, although the liquid ejecting apparatus 100 has the three angle sensors 95, the angle sensors 95 may be omitted. For example, the liquid ejecting apparatus 100 has a receiving unit that receives operation information indicating the operation by a user. The receiving unit includes, for example, multiple buttons. The receiving unit receives operation information indicating the arrangement angles of the heads 10_1, 10_2, and 10_3. The control unit 90, based on the operation information received by the receiving unit, specifies the arrangement angles of the heads 10_1, 10_2, and 10_3.

2.2. Second Modification

In the above-described aspects, although the arrangement angles θ1 and θ2 have been described as less than 70°, one or both of the arrangement angles θ1 and θ2 may be 70° or more. Furthermore, the arrangement angle θ3 may be less than 70°.

2.3. Third Modification

Although each of the multiple heads 10 has the filter 116 in the above-described aspects, the filter 116 may be omitted. Even when each of the multiple heads 10 does not have the filter 116, the bubble discharging level varies among the multiple heads 10 due to the difference in height in the z-axis direction between the introduction ports R_in and the discharge ports R_out in the multiple heads 10. Thus, it is effective to set a greater total circulation-cleaning flow rate for a larger arrangement angle θ.

2.4. Fourth Modification

Although the cases where the heads 10 constitute a line head have been described in the above-described embodiments, the present disclosure is not limited to that configuration, and a serial-type configuration, in which a head 10 is reciprocated in the X-axis direction, may be employed. The liquid ejecting apparatus 100 in the fourth modification includes the heads 10_1 in which the angle between the nozzle faces FN 1 and the horizontal plane SF is the arrangement angle θ1, and the heads 10_2 in which the angle between the nozzle faces FN_2 and the horizontal plane SF is the arrangement angle θ2.

2.5. Fifth Modification

The liquid ejecting apparatus 100 described in the above-described embodiments may be employed in various apparatuses, such as facsimile machines and copiers, besides apparatuses used solely for printing. The use of the liquid ejecting apparatus according to the present disclosure is not limited to printing. For example, a liquid ejecting apparatus that ejects a colorant solution is used as an apparatus for producing color filters of liquid-crystal display devices. Furthermore, a liquid ejecting apparatus that ejects a conductive-material solution is used as an apparatus for producing wires and electrodes of wiring boards.

3. Appendix

For example, the following configurations can be understood from the above-described embodiments.

A liquid ejecting apparatus according to an aspect 1 includes: a first head that has a first nozzle face having multiple nozzles through which liquid is ejected and that is disposed such that an angle between the first nozzle face and a horizontal plane is a first angle; a second head that has a second nozzle face having multiple nozzles through which the liquid is ejected and that is disposed such that an angle between the second nozzle face and the horizontal plane is a second angle, which is greater than the first angle; a first reservoir that stores the liquid to be supplied to the first head; a second reservoir that stores the liquid to be supplied to the second head; a first circulation mechanism that circulates the liquid between the first reservoir and the first head; a second circulation mechanism that circulates the liquid between the second reservoir and the second head; and a control unit that controls the first circulation mechanism and the second circulation mechanism. The control unit performs the circulation cleaning, in which the liquid is circulated, on multiple heads including the first head and the second head. The amount of the liquid circulating through the first head during the circulation cleaning is a first amount, and the amount of the liquid circulating through the second head during the circulation cleaning is a second amount, which is greater than the first amount.

According to the aspect 1, because it is possible to appropriately discharge the bubble in the second head, compared with an aspect in which the circulation cleaning is performed on the second head with the first amount, it is possible to suppress shortage of liquid to be supplied to the second head and defective ejection. Furthermore, when the liquid is excessively circulated through the head, the risk of leakage of the liquid from, for example, connecting portions of flow paths in the head increases, reducing the life of the head. Hence, according to the aspect 1, because it is possible to suppress excessive liquid circulation in the first head compared with an aspect in which the circulation cleaning is performed on the first head with the second amount, it is possible to increase the life of the first head.

In an aspect 2, which is an illustrative example of the aspect 1, a flow rate of the liquid circulating through the first head during the circulation cleaning per unit period is a first flow rate, and a flow rate of the liquid circulating through the second head during the circulation cleaning is a second flow rate, which is higher than the first flow rate.

According to the aspect 2, it is possible to appropriately discharge the bubble in the first head, compared with an aspect in which the second flow rate is set for the first head.

In an aspect 3, which is an illustrative example of the aspect 1, a second period during which the circulation cleaning is performed on the second head is longer than a first period during which the circulation cleaning is performed on the first head.

According to the aspect 3, it is possible to suppress an increase in the liquid viscosity in the first head, compared with an aspect in which the second period is set to the first head.

In an aspect 4, which is an illustrative example of any one of the aspects 1 to 3, the liquid ejecting apparatus further includes: a third head that has a third nozzle face having multiple nozzles through which the liquid is ejected and that is disposed such that an angle between the third nozzle face and the horizontal plane is a third angle, which is greater than the second angle; a third reservoir that stores the liquid to be supplied to the third head; and a third circulation mechanism that circulates the liquid between the third reservoir and the third head. The control unit further controls the third circulation mechanism. The multiple heads further include the third head. The amount of liquid circulating through the third head during the circulation cleaning is a third amount, which is greater than the second amount.

According to the aspect 4, it is possible to appropriately discharge the bubble in the third head.

In an aspect 5, which is an illustrative example of any one of the aspects 1 to 4, the liquid ejecting apparatus further includes: a third head that has a third nozzle face having multiple nozzles through which the liquid is ejected and that is disposed such that an angle between the third nozzle face and the horizontal plane is a third angle, which is greater than the second angle; a third reservoir that stores the liquid to be supplied to the third head; and a third circulation mechanism that circulates the liquid between the third reservoir and the third head. The control unit further controls the third circulation mechanism. The multiple heads further include the third head. A flow rate of the liquid circulating through the third head during the circulation cleaning per unit period is a third flow rate, which is lower than the second flow rate representing the flow rate of the liquid circulating through the second head.

When the third angle is large enough, it is possible to appropriately discharge the bubble in the third head without increasing the flow rate. Hence, according to the aspect 5, it is possible to increase the life of the third head, compared with an aspect in which the second flow rate is set for the third head.

In an aspect 6, which is an illustrative example of the aspect 5, the first angle and the second angle are less than 70°, and the third angle is 70° or more.

When the first angle and the second angle are both less than 70°, it is possible to appropriately discharge the bubble in the first head even when the circulation-cleaning flow rate in the first head is set to be lower than the second flow rate. Furthermore, when the third angle is 70° or more, it is possible to appropriately discharge the bubble in the third head without increasing the flow rate in the third head. Hence, according to the aspect 6, it is possible to increase the life of the third head, compared with an aspect in which the second flow rate is set for the third head.

In an aspect 7, which is an illustrative example of the aspect 5 or 6, the first head includes a first filter substantially parallel to the first nozzle face, the second head includes a second filter substantially parallel to the second nozzle face, and a third head includes a third filter substantially parallel to the third nozzle face.

As described above, due to the presence of the filter in the head, the level to which the bubble is discharged from the head varies with the angle between the nozzle face and the horizontal plane. Hence, according to the aspect 7, by changing the amount of liquid circulated through the head during the circulation cleaning in accordance with the angle between the nozzle face and the horizontal plane, it is possible to appropriately discharge the bubble from the head.

In an aspect 8, which is an illustrative example of any one of the aspects 5 to 7, a third period during which the circulation cleaning is performed on the third head is longer than the second period during which the circulation cleaning is performed on the second head.

According to the aspect 8, it is possible to appropriately discharge the bubble in the third head.

What is claimed is:

1. A liquid ejecting apparatus comprising:

a first head that has a first nozzle face having nozzles configured to eject liquid and that is disposed such that an angle between the first nozzle face and a horizontal plane is a first angle;

a second head that has a second nozzle face having nozzles configured to eject the liquid and that is disposed such that an angle between the second nozzle face and the horizontal plane is a second angle, which is greater than the first angle;

a first reservoir that stores the liquid to be supplied to the first head;

a second reservoir that stores the liquid to be supplied to the second head;

a first circulation mechanism that circulates the liquid between the first reservoir and the first head;

a second circulation mechanism that circulates the liquid between the second reservoir and the second head; and a control unit that controls the first circulation mechanism and the second circulation mechanism, wherein the control unit performs circulation cleaning, in which the liquid is circulated, on multiple heads including the first head and the second head and the amount of the liquid circulating through the first head during the circulation cleaning is a first amount, and the amount of the liquid circulating through the second head during the circulation cleaning is a second amount, which is greater than the first amount.

2. The liquid ejecting apparatus according to claim 1, wherein a flow rate of the liquid circulating through the first head during the circulation cleaning per unit period is a first flow rate, and a flow rate of the liquid circulating through the second head during the circulation cleaning is a second flow rate, which is higher than the first flow rate.

3. The liquid ejecting apparatus according to claim 1, wherein a second period during which the circulation cleaning is performed on the second head is longer than a first period during which the circulation cleaning is performed on the first head.

4. The liquid ejecting apparatus according to claim 1, further comprising:

a third head that has a third nozzle face having nozzles configured to eject the liquid and that is disposed such that an angle between the third nozzle face and the horizontal plane is a third angle, which is greater than the second angle;

a third reservoir that stores the liquid to be supplied to the third head; and a third circulation mechanism that circulates the liquid between the third reservoir and the third head, wherein the control unit further controls the third circulation mechanism, the multiple heads further include the third head, and the amount of the liquid circulating through the third head during the circulation cleaning is a third amount, which is greater than the second amount.

5. The liquid ejecting apparatus according to claim 1, further comprising:

a third head that has a third nozzle face having nozzles configured to eject the liquid and that is disposed such that an angle between the third nozzle face and the horizontal plane is a third angle, which is greater than the second angle;

a third reservoir that stores the liquid to be supplied to the third head; and a third circulation mechanism that circulates the liquid between the third reservoir and the third head, wherein the control unit further controls the third circulation mechanism, the multiple heads further include the third head, and a flow rate of the liquid circulating through the third head during the circulation cleaning per unit period is a third flow rate, which is lower than the second flow rate representing the flow rate of the liquid circulating through the second head.

6. The liquid ejecting apparatus according to claim 5, wherein the first angle and the second angle are less than 70°, and the third angle is 70° or more.

7. The liquid ejecting apparatus according to claim 5, wherein the first head includes a first filter substantially parallel to the first nozzle face, the second head includes a second filter substantially parallel to the second nozzle face, and a third head includes a third filter substantially parallel to the third nozzle face.

8. The liquid ejecting apparatus according to claim 5, wherein a third period during which the circulation cleaning is performed on the third head is longer than the second period during which the circulation cleaning is performed on the second head.

9. The liquid ejecting apparatus according to claim 1, wherein a flow rate of the liquid circulating through the first head during the circulation cleaning per unit period is a first flow rate, a flow rate of the liquid circulating through the second head during the circulation cleaning is a second flow rate, a period during which the circulation cleaning is performed on the first head is a first period, a period during which the circulation cleaning is performed on the second head is a second period, the first amount is obtained by multiplying the first flow rate by the first period, and the second amount is obtained by multiplying the second flow rate by the second period.

* * * * *